US011883980B2

(12) United States Patent
Miyazaki et al.

(10) Patent No.: US 11,883,980 B2
(45) Date of Patent: Jan. 30, 2024

(54) MOLDING UNIT, MOLDING MACHINE, AND MOLDING METHOD

(71) Applicant: SINTOKOGIO, LTD., Nagoya (JP)

(72) Inventors: Hiroyuki Miyazaki, Nagoya (JP); Kimikazu Kaneto, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 91 days.

(21) Appl. No.: 17/711,323

(22) Filed: Apr. 1, 2022

(65) Prior Publication Data

US 2022/0324137 A1 Oct. 13, 2022

(30) Foreign Application Priority Data

Apr. 8, 2021 (JP) ................................ 2021-065705

(51) Int. Cl.

| | |
|---|---|
| ***B22C 9/02*** | (2006.01) |
| ***B22C 15/28*** | (2006.01) |
| ***B28B 7/00*** | (2006.01) |
| ***B28B 3/08*** | (2006.01) |

(52) U.S. Cl.

CPC ............. *B28B 7/0097* (2013.01); *B22C 9/02* (2013.01); *B28B 3/086* (2013.01)

(58) Field of Classification Search

CPC .. B22C 9/02; B22C 9/20; B22C 15/00; B22C 15/02; B22C 15/24; B22C 15/28; B22C 15/30

See application file for complete search history.

(56) References Cited

U.S. PATENT DOCUMENTS

2020/0222973 A1* 7/2020 Takasu .................... B22C 15/28

FOREIGN PATENT DOCUMENTS

| | | | | |
|---|---|---|---|---|
| JP | 2010-525948 A | 7/2010 | | |
| WO | WO-2008/146416 A1 | 12/2008 | | |
| WO | WO-2019017024 A1 * | 1/2019 | ............ | B22C 11/00 |

* cited by examiner

*Primary Examiner* — Kevin P Kerns
*Assistant Examiner* — Steven S Ha
(74) *Attorney, Agent, or Firm* — Faegre Drinker Biddle & Reath LLP

(57) ABSTRACT

A molding unit includes: a flask guide member guiding the upper flask and the lower flask; a first squeeze member and a second squeeze member disposed in such a manner as to sandwich upper and lower flasks as the upper flask and the lower flask connected with each other, the first squeeze member and the second squeeze guide member each capable of entering the upper and lower flasks; a squeeze cylinder including a rod having an end part fixed to the first squeeze member and a cylinder body extending and contracting the rod; and a squeeze guide member configured to fix relative positions of the second squeeze guide member and the cylinder body. The flask guide member is a hollow rod member, and the squeeze guide member is a rod member disposed in a movable manner inside the flask guide member.

9 Claims, 12 Drawing Sheets

MOLDING UNIT, MOLDING MACHINE, AND MOLDING METHOD

CROSS-REFERENCE TO RELATED APPLICATIONS

This application is based on and claims the benefit of priority from Japanese Patent Application No. 2021-065705 filed on Apr. 8, 2021, and the entire contents of which are incorporated herein by reference.

TECHNICAL FIELD

The present disclosure relates to a molding unit, a molding machine, and a molding method.

BACKGROUND

Japanese Unexamined Patent Publication (Translation of PCT Application) No. 2010-525948 discloses a molding machine for forming a mold by squeezing sand. The molding machine includes an upper flask, a lower flask, a match plate sandwiched by the upper flask and the lower flask, an upper squeeze member inserted into the upper flask, a lower squeeze member inserted into the lower flask, an upper actuator for moving the upper squeeze member, a lower actuator for moving the lower squeeze member, and a support frame body.

The upper actuator and the lower actuator are connected to the support frame. Each of the upper actuator and the lower actuator is a hydraulic cylinder extending and contracting a rod, for example. When the upper actuator and the lower actuator extend, the upper squeeze member and the lower squeeze member move toward the match plate, and sand in a molding space in the upper flask and the lower flask is squeezed.

SUMMARY

In the molding machine described in Japanese Unexamined Patent Publication (Translation of PCT Application) No. 2010-525948, the upper actuator and the lower actuator are necessary to perform the squeezing. Here, in order to reduce manufacturing cost including initial cost and the like, it is conceivable to reduce the number of actuators. However, to perform squeezing with one actuator, it is necessary to add, to the actuator causing one squeeze member to enter the upper and lower flasks, a guide member for fixing the other squeeze member. Then, to achieve uniform squeezing, it is necessary to dispose the guide member in a position where it can support the squeeze member stably. However, since the position where the guide member can support the squeeze member stably is the same as the position where a guide member can support weights of the upper and lower flasks stably, the guide member of the squeeze member and the guide member for guiding the upper flask and the lower flask interfere with each other. For this reason, it is difficult to dispose the guide member of the squeeze member in an appropriate position. Hence, it may be difficult to manufacture a high-quality mold by simply reducing the number of actuators to reduce manufacturing cost. The present disclosure provides a molding unit, a molding machine, and a molding method that can reduce manufacturing cost while ensuring molding accuracy.

A molding unit according to one aspect of the present disclosure comprises: an upper flask; a lower flask configured to connect to the upper flask; a flask guide member to which the upper flask and the lower flask are connected in a movable manner, the flask guide member guiding the upper flask and the lower flask a first squeeze member and a second squeeze guide member disposed in such a manner as to sandwich upper and lower flasks as the upper flask and the lower flask connected with each other, the first squeeze member and the second squeeze member each capable of entering the upper and lower flasks; a squeeze cylinder disposed to be movable relative to the upper and lower flasks, and including a rod having an end part fixed to the first squeeze member and a cylinder body extending and contracting the rod; and a squeeze guide member configured to fix relative positions of the second squeeze member and the cylinder body. The flask guide member is a hollow rod member, and the squeeze guide member is a rod member disposed in a movable manner inside the flask guide member.

In the molding unit, the first squeeze member enters the upper and lower flasks by the extension of the rod of the squeeze cylinder. Here, the squeeze cylinder is disposed to be movable relative to the upper and lower flasks, and therefore is moved in the opposite direction of the squeezing direction of the first squeeze member by the reactive force obtained through the first squeeze member. The second squeeze member is fixed to the cylinder body by the squeeze guide member, and therefore moves in the opposite direction of the squeezing direction of the first squeeze member with the movement of the squeeze cylinder. As a result, the first squeeze member and the second squeeze guide member can move toward each other using one squeeze cylinder. As described above, the molding unit can perform squeezing appropriately using one squeeze cylinder. Hence, the molding unit can reduce initial cost as compared to a molding unit of a molding machine that performs squeezing with two actuators. Moreover, the squeeze guide member is disposed in a movable manner inside the flask guide member. As a result, in the molding unit, interference between the squeeze guide member and the flask guide member can be avoided. Hence, in the molding unit, the squeeze guide member can be disposed in a position where the squeeze member can be supported stably, while the flask guide member can be disposed in a position where the weights of the upper and lower flasks can be supported stably. Hence, the molding unit can reduce manufacturing cost while ensuring molding accuracy.

In one embodiment, the molding unit may further comprise a pair of flask guide members including the flask guide member, and a pair of squeeze guide members including the squeeze guide member. Each of the pair of flask guide members may be a hollow rod member, and each of the pair of squeeze guide members may be a rod member disposed in a movable manner inside a corresponding one of the flask guide members. In this case, each of the pair of squeeze guide members is disposed in a movable manner inside a corresponding one of the flask guide members. As a result, in the molding unit, interference between the pair of squeeze guide members and the pair of flask guide members can be avoided. Hence, in the molding unit, the pair of squeeze guide members can be disposed in positions where the squeeze members can be supported stably, while the pair of flask guide members can be disposed in positions where the weights of the upper and lower flasks can be supported stably. Hence, the molding unit can appropriately ensure molding accuracy.

In one embodiment, the pair of flask guide members may be disposed in positions symmetric with respect to a central line passing through a center of each of the upper flask and the lower flask. In this case, the pair of flask guide members and the pair of squeeze guide members disposed inside the pair of flask guide members are disposed in positions symmetric with respect to the center of the upper flask and the lower flask. As a result, since the pair of flask guide members can support the weights of the upper flask and the lower flask in a balanced manner, the upper flask and the lower flask are guided stably. Moreover, since the pair of squeeze guide members can fix the second squeeze member to the cylinder body in a balanced manner, a uniform and appropriate squeezing force can be applied stably to the inside of the upper and lower flasks. Hence, the molding unit can further curb deterioration of molding accuracy.

In one embodiment, the squeeze guide member may include a tip end part to which the second squeeze guide member is fixed and a terminal end part, and the molding unit may further comprise a fixing member fixing the squeeze guide member to the cylinder body. In this case, the molding unit can fix the position of the second squeeze guide member relative to the cylinder body of the squeeze cylinder using the fixing member.

A molding machine according to another aspect of the present disclosure comprises: a molding unit; a flask moving part moving the upper flask and the lower flask relative to each other along the flask guide member such that a pattern member is sandwiched between and released from the upper flask and the lower flask; a transport part carrying the pattern member in and out from between the upper flask and the lower flask; and a transport switching part rotating the transport part.

In the molding machine, the pattern member is carried in or out from between the upper flask and the lower flask by the transport part. The transport switching part can rotate the transport part disposed to face the upper and lower flasks to a position not facing the upper and lower flasks, for example. As a result, by placing a new pattern member on the transport part disposed in the position not facing the upper and lower flasks and then rotating by the transport switching part, the new pattern member to be sandwiched by the upper flask and the lower flask can be replaced smoothly. Hence, the molding machine can smoothly replace the pattern member and perform molding even in a case of molding using a plurality of pattern members.

In one embodiment, the molding machine may further comprise a slide part sliding the lower flask in a state where the upper flask and the lower flask are separated. In this case, the operator can easily access the lower flask without interfering with the flask guide member and the upper flask. For example, workability when installing a core in the lower flask is improved.

A molding method according to another aspect of the present disclosure is a molding method using a molding unit, the molding unit including an upper flask, a lower flask configured to connect to the upper flask, a flask guide member to which the upper flask and the lower flask are connected in a movable manner, the flask guide member guiding the upper flask and the lower flask, a first squeeze member and a second squeeze member disposed in such a manner as to sandwich upper and lower flasks as the upper flask and the lower flask connected with each other, the first squeeze member and the second squeeze guide member each capable of entering the upper and lower flasks, a squeeze cylinder disposed to be movable relative to the upper and lower flasks, and including a rod having an end part fixed to the first squeeze member and a cylinder body extending and contracting the rod, and a squeeze guide member configured to fix relative positions of the second squeeze member and the cylinder body, the flask guide member being a hollow rod member, and the squeeze guide member being a rod member disposed in a movable manner inside the flask guide member, the molding method comprising fixing the squeeze guide member to the cylinder body, and extending the rod to perform squeezing by the first squeeze member and the second squeeze member.

With this molding method, as in the case of the molding unit and the molding machine described above, manufacturing cost can be reduced while ensuring molding accuracy.

According to the molding unit, the molding machine, and the molding method of the present disclosure, manufacturing cost can be reduced while ensuring molding accuracy.

DETAILED DESCRIPTION

Figure 1:
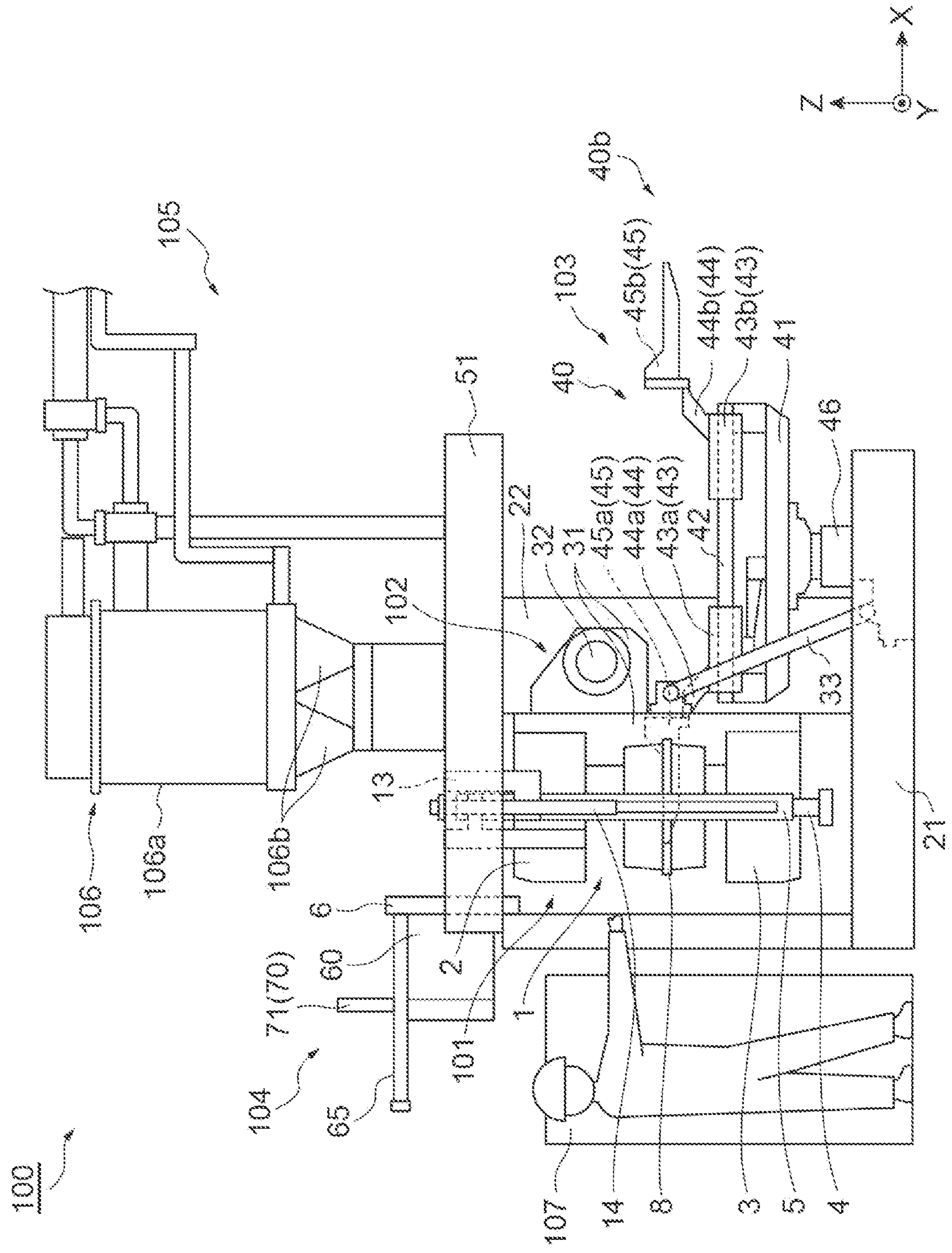
FIG. 1 is a side view illustrating an example of a molding machine according to an embodiment.

Hereinafter, an embodiment of the present disclosure will be described with reference to the drawings. Note that in the following description, the same or corresponding elements are assigned the same reference sign and overlapping description is not repeated. The dimensional ratio in the drawings does not necessarily coincide with that in the description. The terms “upper,” “lower,” “left,” and “right” are based on states illustrated in the drawings, and are used for convenience of the description.

[Outline of Molding Machine]

FIG. 1 is a side view illustrating an example of a molding machine according to an embodiment. In FIG. 1, the X direction and the Y direction are horizontal directions, and the Z direction is the vertical direction. The X direction, the Y direction, and the Z direction are axial directions orthogonal to one another in an orthogonal coordinate system in three-dimensional space. In the following description, the Z direction is also referred to as the up-down direction. A molding machine 100 illustrated in FIG. 1 is a molding machine for forming a cope and a drag. The molding machine 100 includes a molding flask unit 1, a rotating part 102, a pattern replacement part 103, and a squeeze unit 104. The molding flask unit 1 configured to be movable between a first position 101 and a second position 105. The first position 101 is a working position set in the molding machine 100, and is a position where a model (pattern) is disposed between the upper and lower flasks and where a mold is removed. The second position 105 is a position where sand is poured into the upper and lower flasks and squeezed in the molding machine 100.

The molding flask unit 1 illustrated in FIG. 1 is located in the first position 101. The molding flask unit 1 includes an upper flask 2 and a lower flask 3. Each of the upper flask 2 and the lower flask 3 is a box-shaped frame body with open upper and lower ends. The upper flask 2 and the lower flask 3 move toward each other, and are connected with each other while sandwiching a pattern member 8 carried in by the pattern replacement part 103. The pattern member 8 is a plate member on which a model can be disposed. A model is disposed on at least one of an upper surface and a lower surface of the pattern member 8. Hereinafter, the connected upper flask 2 and lower flask 3 are also referred to as the upper and lower flasks 2 and 3.

The rotating part 102 rotates the molding flask unit 1 including the upper flask 2 and the lower flask 3 with the pattern member 8 sandwiched therebetween in such a manner as to be positioned on the same horizontal plane (XY plane). The molding flask unit 1 rotated by the rotating part 102 moves to the second position 105 provided above the first position 101 and is mounted onto the squeeze unit 104. In the second position 105, the upper flask 2 and the lower flask 3 mounted onto the squeeze unit 104 are filled with sand. The sand filling the upper flask 2 and the lower flask 3 is pressurized in the X direction, for example, so that a cope in the upper flask 2 and a drag in the lower flask 3 are formed simultaneously. Thereafter, the molding flask unit 1 is rotationally moved from the second position 105 to the first position 101 by the rotating part 102. In the first position 101, the upper flask 2 and the lower flask 3 are separated, the pattern member 8 is removed from between the upper flask 2 and the lower flask 3, and then the upper flask 2 and the lower flask 3 are aligned. The aligned cope and drag are removed from the upper and lower flasks 2 and 3 and carried out of the machine. As described above, the molding machine 100 forms the flaskless cope and drag.

[Details of Molding Flask Unit]

Figure 2:
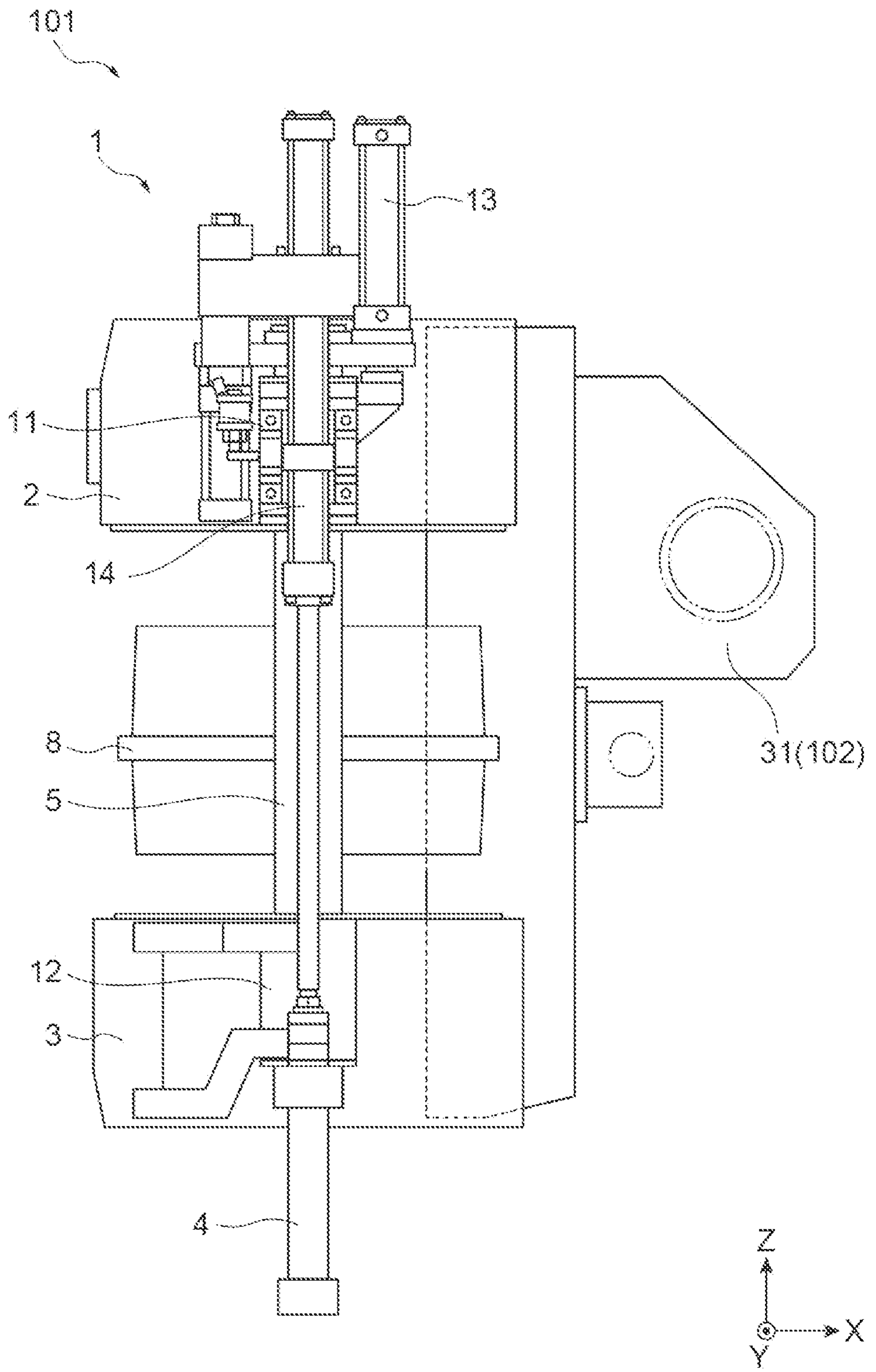
FIG. 2 is a side view of a molding flask unit illustrated in FIG. 1.
Figure 3:
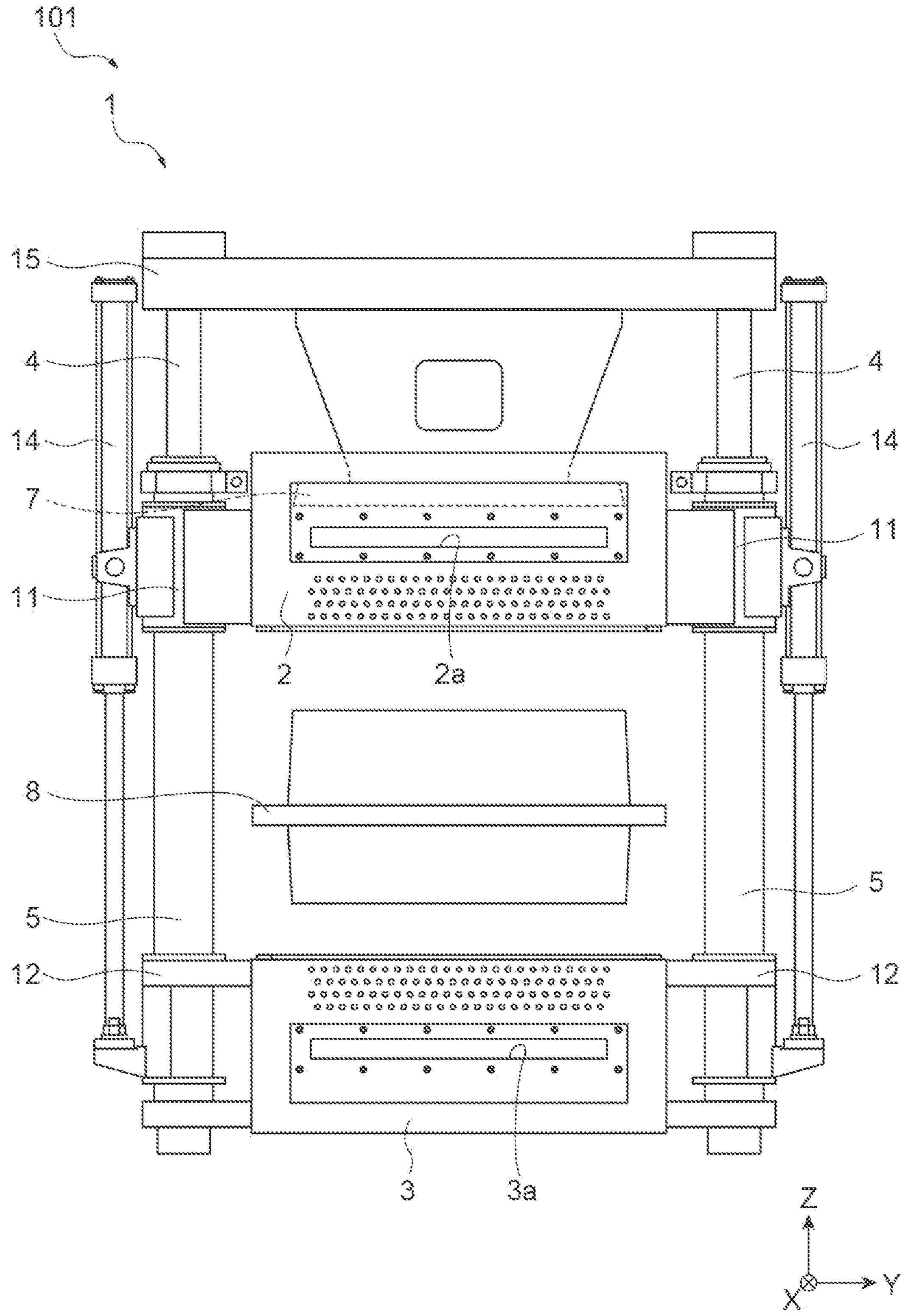
FIG. 3 is a front view of the molding flask unit illustrated in FIG. 1.
Figure 4:
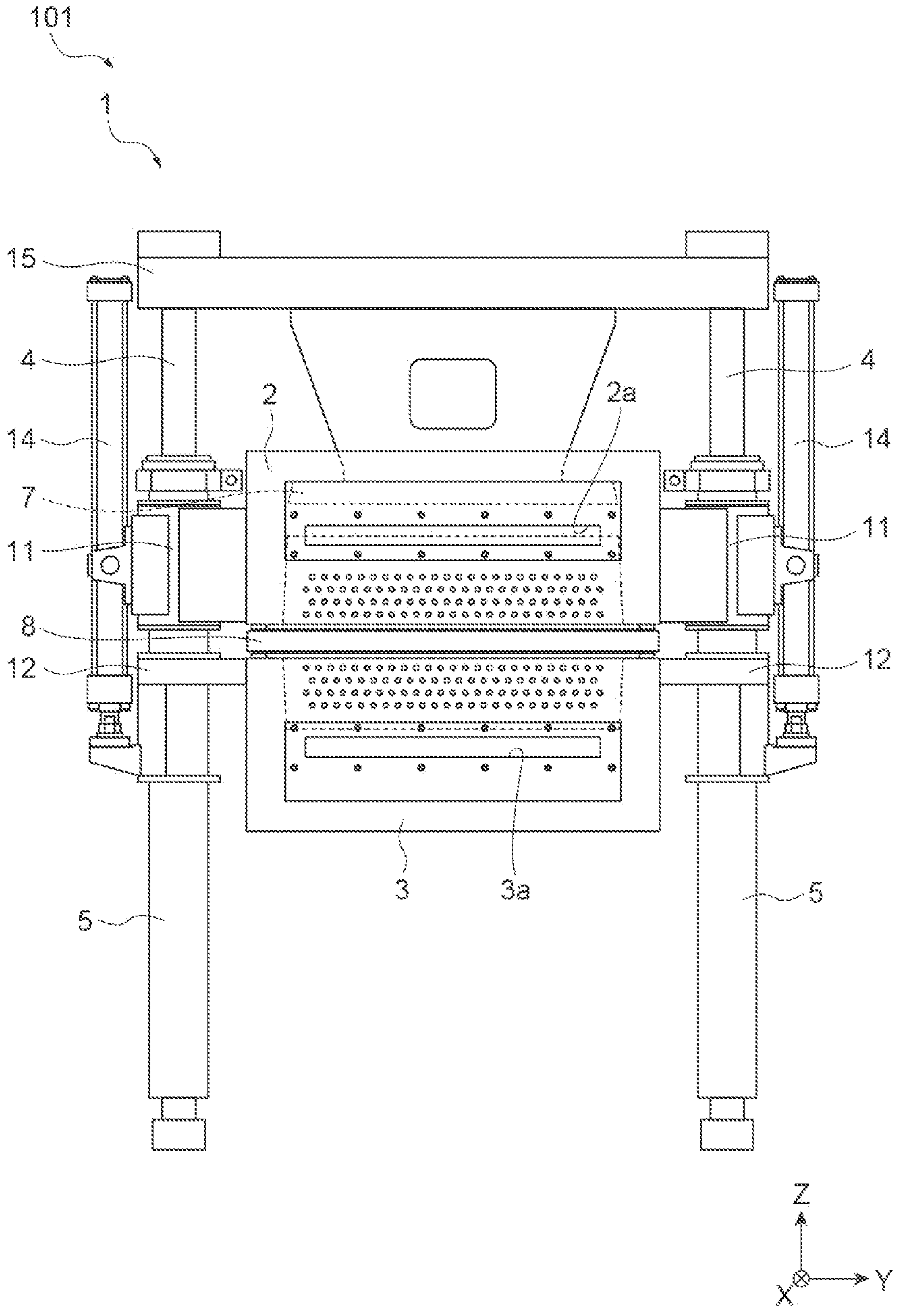
FIG. 4 is a front view illustrating an example of a state where upper and lower flasks of the molding flask unit illustrated in FIG. 1 are connected.

FIG. 2 is a side view of the molding flask unit illustrated in FIG. 1, and FIG. 3 is a front view of the molding flask unit illustrated in FIG. 1. FIGS. 1 to 3 illustrate an initial state where the upper flask and the lower flask are separated. FIG. 4 is a front view illustrating an example of a state where the upper and lower flasks of the molding flask unit illustrated in FIG. 1 are connected. As illustrated in FIGS. 1 to 4, the molding flask unit 1 configured to rotate by the rotating part 102 includes the upper flask 2, the lower flask 3, flask guide members 5, 5, squeeze guide members 4, 4, and an upper squeeze plate 7 (example of second squeeze member).

In the first position 101, the upper flask 2 is disposed above the position into which the pattern member 8 is carried, and between the flask guide members 5, 5 in the Y direction. The upper flask 2 includes therein a space that can accommodate a model disposed on the upper surface of the pattern member 8. A lower end part of the upper flask 2 can abut on the upper surface of the pattern member 8, for example. A side wall part of the upper flask 2 is provided with a sand inlet 2a penetrating to an internal space from the outside.

In the first position 101, the lower flask 3 is disposed below the position into which the pattern member 8 is carried, and between the flask guide members 5, 5 in the Y direction. The lower flask 3 includes therein a space that can accommodate a model disposed on the lower surface of the pattern member 8. An upper end part of the lower flask 3 can abut on the lower surface of the pattern member 8, for example. A side wall part of the lower flask 3 is provided with a sand inlet 3a penetrating to an internal space from the outside.

The flask guide member 5 is a rod member guiding the upper flask 2 and the lower flask 3, and extends in the up-down direction in FIGS. 1 to 4. The flask guide member 5 has a columnar shape, for example. The upper flask 2 and the lower flask 3 are movably connected to the flask guide members 5, 5. The upper flask 2 is movably connected to the flask guide members 5, 5 with upper flask connectors 11, 11. Upper flask adjustment cylinders 13, 13 (example of flask moving part) are connected to the upper flask 2. The upper flask 2 moves by the driving force of the upper flask adjustment cylinders 13, 13. The lower flask 3 is movably connected to the flask guide members 5, 5 with lower flask connectors 12, 12. Lower flask adjustment cylinders 14, 14 (example of flask moving part) are connected to the lower flask 3. The lower flask 3 moves by the driving force of the lower flask adjustment cylinders 14, 14. As described above, the upper flask adjustment cylinder 13 and the lower flask adjustment cylinder 14 move the upper flask 2 and the lower flask 3 relative to and along the flask guide members 5, 5, so that the pattern member 8 is sandwiched by and released from the upper flask 2 and the lower flask 3. The upper flask adjustment cylinder 13 and the lower flask adjustment cylinder 14 may be hydraulic cylinders, air cylinders, or electric cylinders. The upper flask 2 and the lower flask 3 come close to each other when one or both of them move, and are connected with the pattern member 8 sandwiched therebetween as illustrated in FIG. 4.

The upper squeeze plate 7 is a plate member that can be inserted into the upper flask 2 from an upper end opening of the upper flask 2. The upper squeeze plate 7 defines a molding space for forming the cope together with the upper flask 2 and the pattern member 8. The upper squeeze plate 7 is guided by the squeeze guide members 4, 4. The squeeze guide member 4 is a rod member connected to the upper squeeze plate 7, and extends in the up-down direction in FIGS. 1 to 4. The squeeze guide member 4 has a columnar shape, for example. Each of the squeeze guide members 4, 4 includes a tip end part connected to a frame 15, and is connected to the upper squeeze plate 7 through the frame 15. That is, the squeeze guide members 4, 4 and the upper squeeze plate 7 are fixed as one unit. A terminal end part of the squeeze guide member 4 has a larger diameter than that of a center part (part other than both ends of rod member) of the squeeze guide member 4. As described above, the squeeze guide member 4 includes the tip end part to which the upper squeeze plate 7 is fixed and the terminal end part having a large diameter.

The flask guide member 5 is a hollow rod member, and is a tubular member, for example. The flask guide member 5 has a cylindrical shape, for example, and has an internal space penetrating in the axial direction. A corresponding squeeze guide member 4 is movably disposed in the internal space of the flask guide member 5. That is, the inner diameter of the flask guide member 5 is larger than the outer diameter of the center part of the corresponding squeeze guide member 4. Additionally, the terminal end part of the squeeze guide member 4 projects from the terminal end of the corresponding flask guide member 5, and has a larger outer diameter than the inner diameter of the corresponding flask guide member 5. As described above, since the guide member has a double-layer structure, the squeeze guide members 4, 4 and the flask guide members 5, 5 are disposed in the same position without interfering with each other. The squeeze guide members 4, 4 can move independently of the flask guide members 5, 5 until their tip end part or terminal end part abut on end parts of the flask guide members 5, 5.

The flask guide members 5, 5 are disposed in positions symmetric with respect to a central line passing through the center of each of the upper flask 2 and the lower flask 3, for example. For example, when the molding flask unit 1 is disposed in the first position 101, the flask guide members 5, 5 are disposed in positions symmetric with respect to a central line passing through the center of the XY plane of each of the upper flask 2 and the lower flask 3. The positions symmetric with respect to the central line passing through the center of each of the upper flask 2 and the lower flask 3 are positions where the flask guide members 5, 5 can stably support the upper flask 2 and the lower flask 3, so that misalignment and partial wear are less likely to occur. Moreover, the positions symmetric with respect to the central line passing through the center of each of the upper flask 2 and the lower flask 3 are positions where the squeeze guide members 4, 4 can stably support the upper squeeze plate 7, so that irregularity in the squeezing force is less likely to occur. Since the guide member has the double-layer structure, the squeeze guide members 4, 4 and the flask guide members 5, 5 are disposed in optimal positions.

[Details of Rotating Part]

Figure 5:
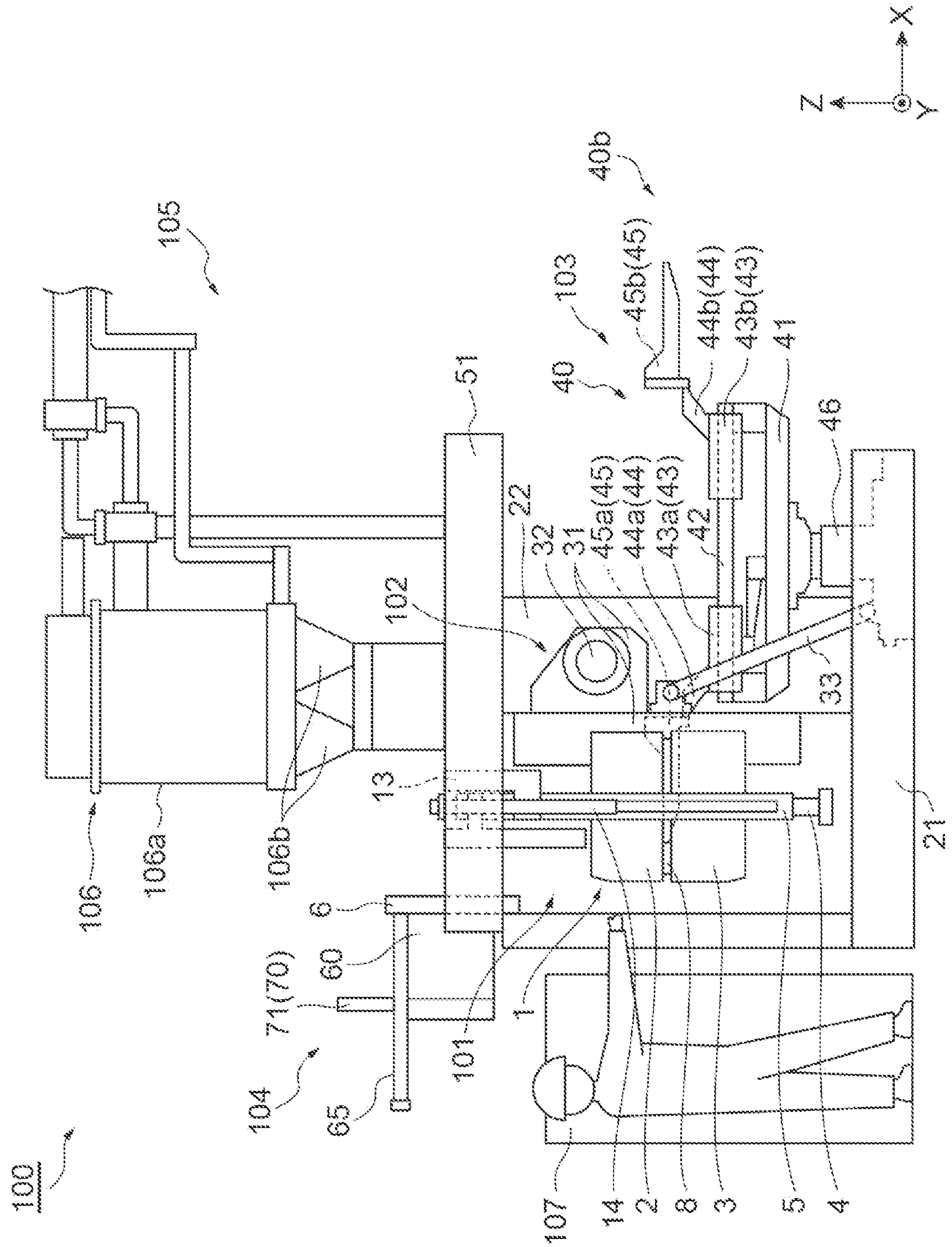
FIG. 5 is a side view illustrating an example of the molding machine in a state where the upper and lower flasks are connected.
Figure 6:
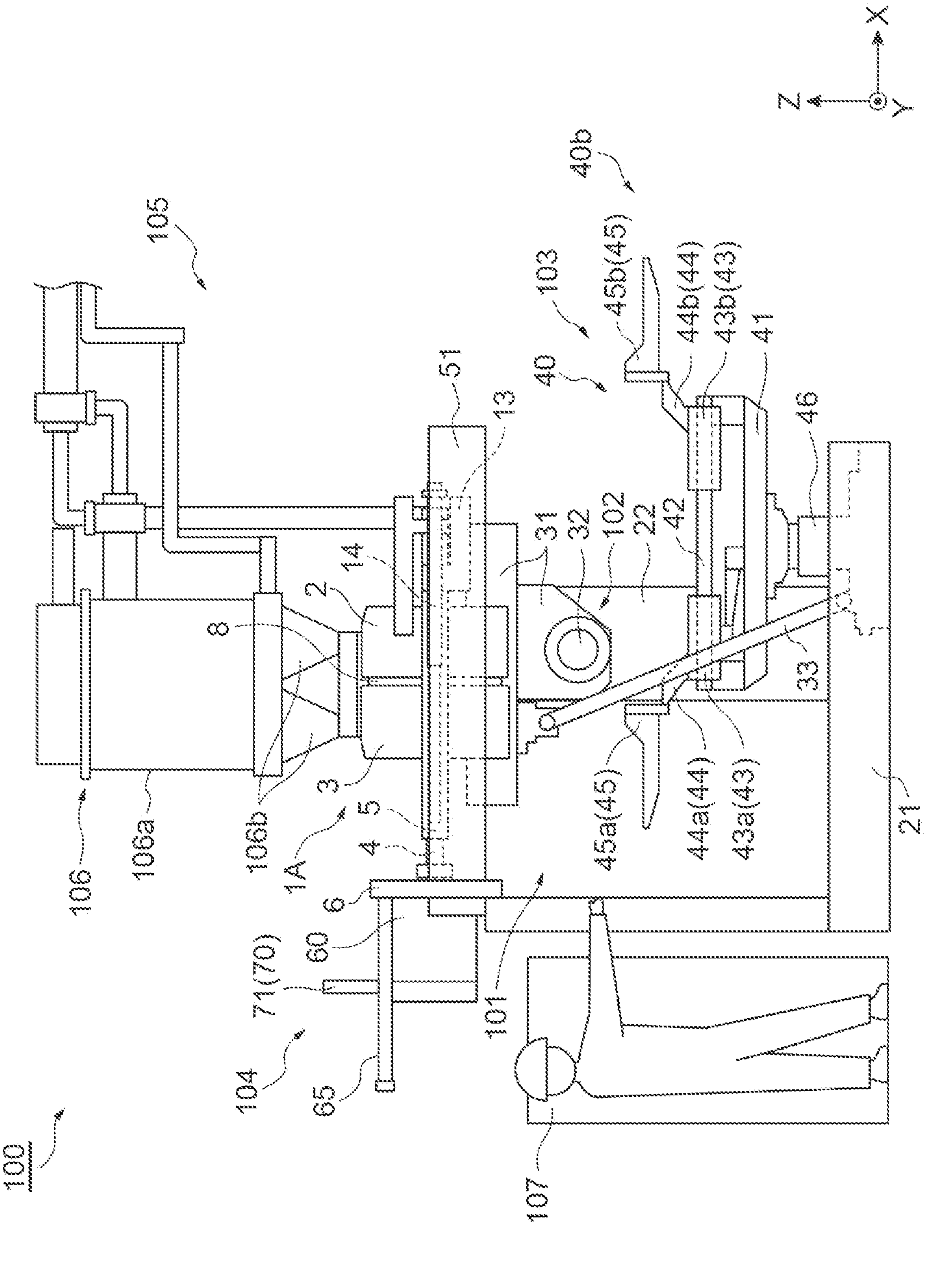
FIG. 6 is a side view illustrating an example of the molding machine in a state where the molding flask unit is rotated.

FIG. 5 is a side view illustrating an example of the molding machine in a state where the upper and lower flasks are connected. FIG. 6 is a side view illustrating an example of the molding machine in a state where the molding flask unit is rotated. As illustrated in FIGS. 5 and 6, the rotating part 102 is provided in a strut 22 erected on a base 21 of the molding machine 100. The strut 22 is disposed on the side (positive X-axis direction) of the first position 101. The rotating part 102 includes an attachment frame 31, a rotating shaft 32, and rotation drivers 33, 33. The flask guide members 5, 5 are fixed to the attachment frame 31. With this configuration, the attachment frame 31 supports the molding flask unit 1. The attachment frame 31 is opened such that the pattern member 8 can be carried in and out of the first position 101 from the pattern replacement part 103.

The rotating shaft 32 is provided in the strut 22, and is a member extending in the Y direction. The rotating shaft 32 is provided in the strut 22 in such a manner as to be configured to rotate about the axis thereof. The rotation driver 33 is a drive source of the rotation of the molding flask unit 1. The rotation driver 33 is a cylinder including a rod that can extend and contract in the axial direction, for example. The rotation driver 33 has its terminal end fixed to the base 21 in such a manner as to be configured to rotate about an axis extending in the Y direction, and its tip end fixed to the attachment frame 31 in such a manner as to be configured to rotate about an axis extending in the Y direction. When the rod of each of the rotation drivers 33, 33 is extended by the cylinder, an upward (clockwise direction about rotating shaft 32) force is applied to the attachment frame 31, and the attachment frame 31 can be moved to the second position 105. When the rod of each of the rotation drivers 33, 33 is extended by the cylinder, a downward (anticlockwise direction about rotating shaft 32) force is applied to the attachment frame 31, and the attachment frame 31 can be moved to the first position 101. As described above, the rotating part 102 can rotate the molding flask unit 1 together with the attachment frame 31.

[Details of Pattern Replacement Part]

As illustrated in FIG. 1, the pattern replacement part 103 is disposed on the side (positive X-axis direction) of the first position 101. The pattern replacement part 103 includes a transport part 40 and a transport switching part 46. The transport part 40 carries the pattern member 8 in and out from between the upper flask 2 and the lower flask 3. The transport part 40 includes a transport base 41, a transport rail 42, an arm moving part 43, an arm 44, and a placement part 45.

The transport base 41 supports the transport rail 42. The transport rail 42 extends in a direction (X-axis direction) of moving toward and retracting from the first position 101. The transport rail 42 has a linear shape, and moves two arm units along the extending direction of the rail, for example. A first arm unit includes a first arm moving part 43*a*, a first arm 44*a*, and a first placement part 45*a*. The first arm moving part 43*a* includes a motor, for example, and moves along the transport rail 42. The motor included in the first arm moving part 43*a* is an electric motor or a hydraulic motor, for example. The first arm 44*a* is provided in the first arm moving part 43*a* and supports the first placement part 45*a*. The pattern member 8 can be placed on the first placement part 45*a*. A second arm unit has the same configuration as the first arm unit, and includes a second arm moving part 43*b*, a second arm 44*b*, and a second placement part 45*b*. The first arm unit and the second arm unit are disposed at both ends of the transport rail 42.

The transport switching part 46 supports the transport base 41 and rotates the transport base 41. The transport switching part 46 rotates the transport base 41 such that the arm unit disposed at the end part of the transport rail 42 faces the first position 101. The arm unit in the position facing the first position 101 is moved along the transport rail 42 toward the first position 101 by the arm moving part 43, places the arm 44 between the flask guide members 5, 5 in the first position 101, and carries the pattern member 8 in and out by the placement part 45.

When the first arm unit faces the first position 101, the second arm unit is in a pattern preparation position 40*b*. The pattern preparation position 40*b* is a position where a new pattern member 8 is placed on the placement part 45 and a used pattern member 8 is collected.

For example, in a case of replacing the pattern member 8, the first placement part 45*a* of the first arm unit receives the used pattern member 8 from the first position 101 and carries it out. The second placement part 45*b* of the second arm unit receives the new pattern member 8 in the pattern preparation position 40*b*. Subsequently, the first arm moving part 43*a* retracts the first placement part 45*a* having received the used pattern member 8 toward the center (positive X-axis direction) of the transport base 41 from the first position 101. The second arm moving part 43*b* retracts the second placement part 45*b* having received the new pattern member 8 toward the center (negative X-axis direction) of the transport base 41 from the pattern preparation position 40*b*. As a result, during rotation of the transport base 41 described later, it is possible to curb interference of the rotating first arm unit and the second arm unit with components of the molding machine 100 such as the molding flask unit 1. Subsequently, the transport switching part 46 rotates the transport base 41 by 180 degrees. As a result, the second placement part 45*b* on which the new pattern member 8 is placed moves to a position facing the first position 101, and the first placement part 45*a* on which the used pattern member 8 is placed moves to the pattern preparation position 40*b*. The second placement part 45*b* of the second arm unit carries in the new pattern member 8 in the first position 101. The pattern member 8 placed on the first placement part 45*a* of the first arm unit is collected by an operator or the like in the pattern preparation position 40*b*. Thus, replacement of the pattern member 8 is completed.

[Details of Squeeze Unit]

Figure 7:
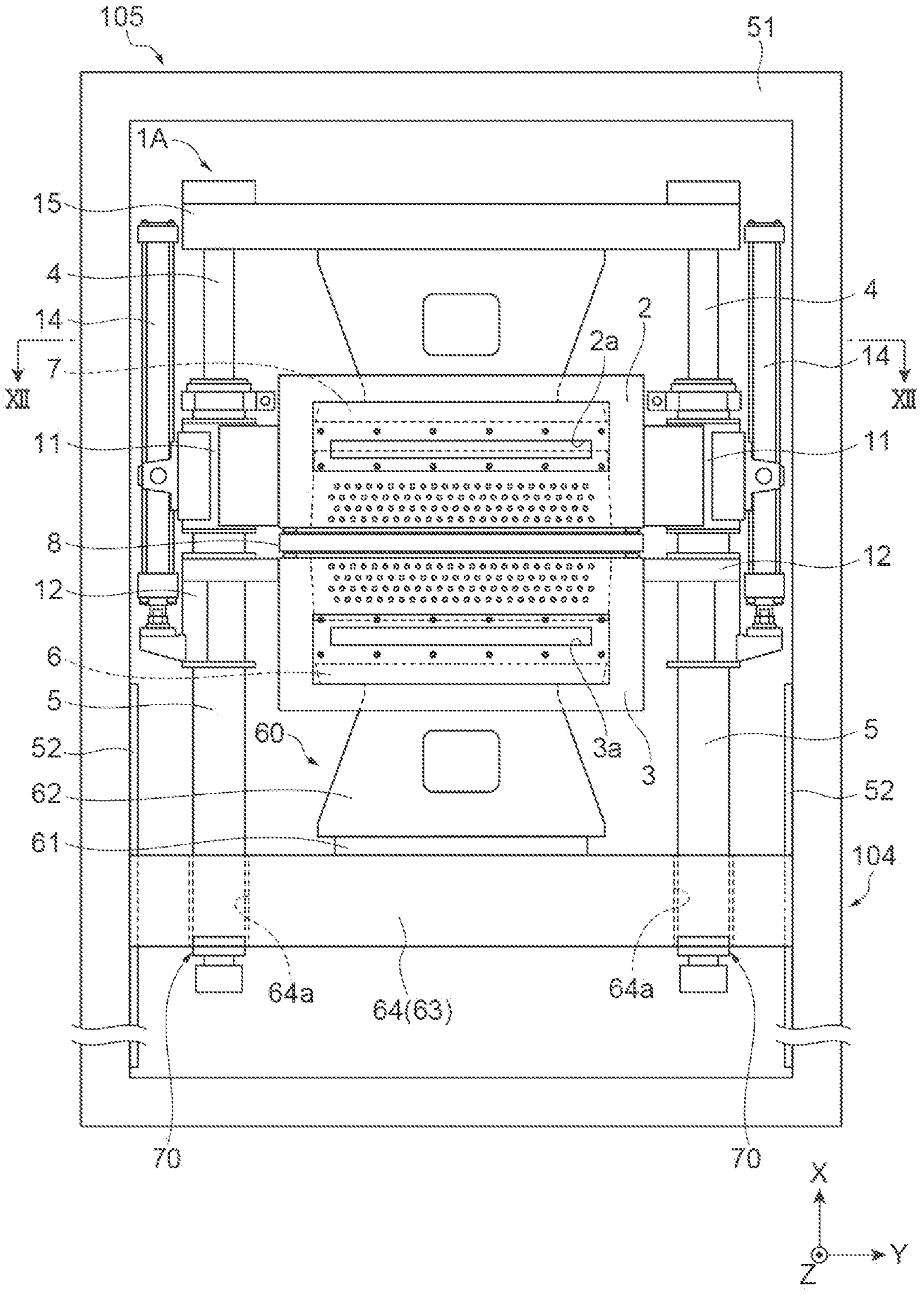
FIG. 7 is a plan view illustrating an example of a molding unit before squeezing.

FIG. 7 is a plan view illustrating an example of a molding unit before squeezing. A molding unit 1A illustrated in FIG. 7 is configured such that the molding flask unit 1 is in the second position 105 and mounted onto the squeeze unit 104 as illustrated in FIG. 6. When the molding flask unit 1 is mounted onto the squeeze unit 104, the molding spaces of the upper flask 2 and the lower flask 3 are formed. Thereafter, sand is supplied to the molding space of each of the upper and lower flasks 2 and 3 and squeezed by the squeeze unit 104. Details will be described below.

The squeeze unit 104 includes a molding support part 51, molding rails 52, 52, a lower squeeze plate 6 (example of first squeeze member), a squeeze cylinder 60, and guide fixing parts 70, 70.

The molding support part 51 is a frame-shaped member fixed to the strut 22 and extending in the horizontal direction. The molding support part 51 includes, inside its frame, a space that can accommodate the molding flask unit 1. The space is open in the up-down direction.

The molding rails 52, 52 guide the squeeze cylinder 60 along the X axis. The molding rails 52, 52 are provided on an inner wall surface of the molding support part 51, for example. The molding rails 52, 52 face each other in the Y direction and extend in the squeezing direction (X direction). The number or installation position of the molding rail may be changed appropriately depending on the shape of the molding support part 51. As described above, the squeeze cylinder 60 is disposed in such a manner as to be movable relative to the upper and lower flasks 2 and 3.

The lower squeeze plate 6 is a plate member that can enter the lower flask 3 from a lower end opening of the lower flask 3. The lower squeeze plate 6 defines a molding space for forming a drag together with the lower flask 3 and the pattern member 8. The lower squeeze plate 6 is disposed in such a manner as to sandwich the upper and lower flasks 2 with the upper squeeze plate 7. The lower squeeze plate 6 enters the lower flask 3 by being driven by the squeeze cylinder 60.

The squeeze cylinder 60 includes a rod 61 and a cylinder body 63. The rod 61 has, on its end part, the lower squeeze plate 6 with a squeeze seat 62 interposed therebetween. The cylinder body 63 controls the extending and contracting amount and timing of the rod 61. The squeeze cylinder 60 may be a hydraulic cylinder, an air cylinder, or an electric cylinder.

The cylinder body 63 includes an attachment member 64, and is disposed on the molding rails 52, 52 described above with the attachment member 64 interposed therebetween. A rod of a moving cylinder 65 for moving the squeeze cylinder 60 along the X axis is connected to the attachment member 64 (see FIG. 1). The moving cylinder 65 may be a hydraulic cylinder, an air cylinder, or an electric cylinder. When the rod of the moving cylinder 65 extends, the cylinder body 63 comes close to the lower flask 3. The cylinder body 63 extends the rod 61 near the lower flask 3. As a result, the squeeze seat 62 presses the lower squeeze plate 6 in the positive X-axis direction and causes the lower squeeze plate 6 to enter the opening of the lower flask 3. As a result, the molding space for forming the drag is defined.

The attachment member 64 of the cylinder body 63 includes first openings 64*a*, 64*a* into which end parts of the squeeze guide members 4, 4 can be inserted. The first opening 64*a* penetrates along the X axis. The diameter of the first opening 64*a* is larger than the diameter of a center part of the squeeze guide member 4 and the diameter of an end part of the squeeze guide member 4. Hence, the squeeze guide member 4 can be inserted into the first opening 64*a* in the attachment member 64 of the cylinder body 63. The squeeze guide member 4 inserted into the first opening 64*a* is restricted from moving in the positive X-axis direction by a guide fixing part 70 provided in the attachment member 64. Since the squeeze guide member 4 inserted into the first opening 64*a* is fixed to the attachment member 64 such that the squeeze guide member 4 is restricted from moving in the positive X-axis direction, positions of the squeeze guide members 4, 4 relative to the upper squeeze plate 7 and the cylinder body 63 are fixed at the time of squeezing. As a result, at the time of squeezing, the movement of the cylinder body 63 is linked with the movement of the upper squeeze plate 7. Note that when the movement of the squeeze guide members 4, 4 in the positive X-axis direction is restricted, the upper squeeze plate 7 enters the upper flask 2 from an upper end opening of the upper flask 2. As a result, the molding space for forming the cope is defined by the upper squeeze plate 7, the upper flask 2, and the pattern member 8.

Figure 8A:
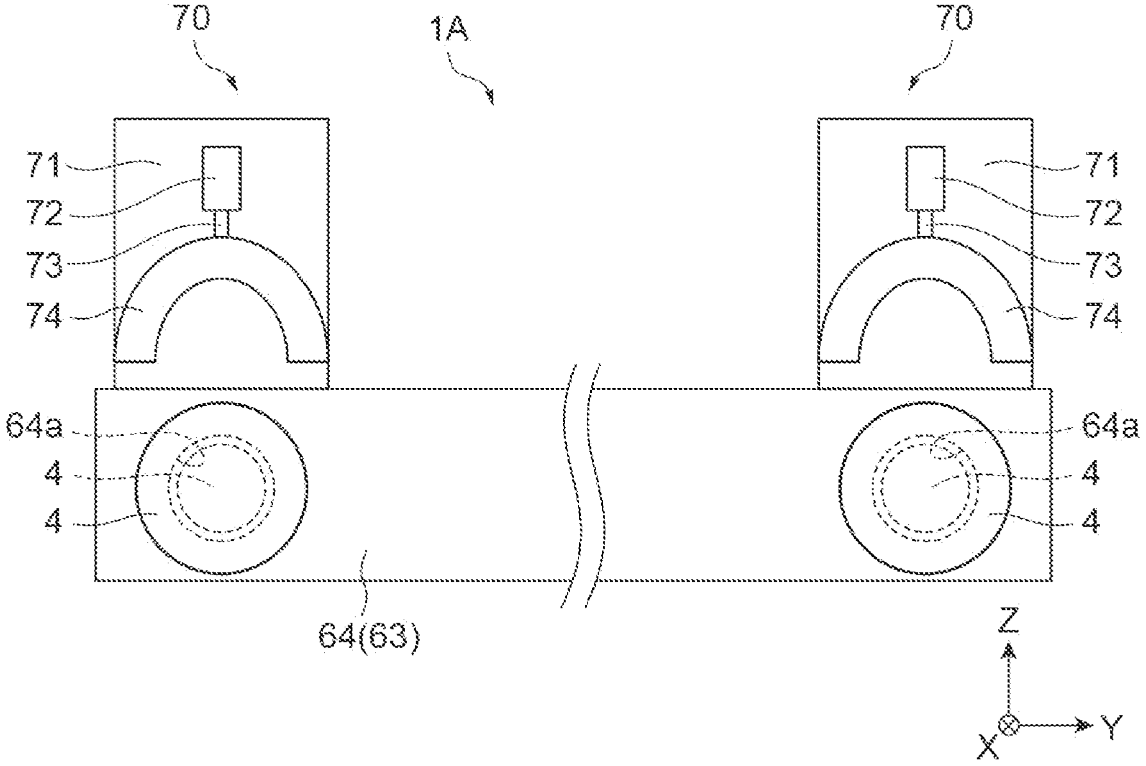
FIGS. 8A-8B are a front view illustrating an example of a guide fixing part.
Figure 8B:
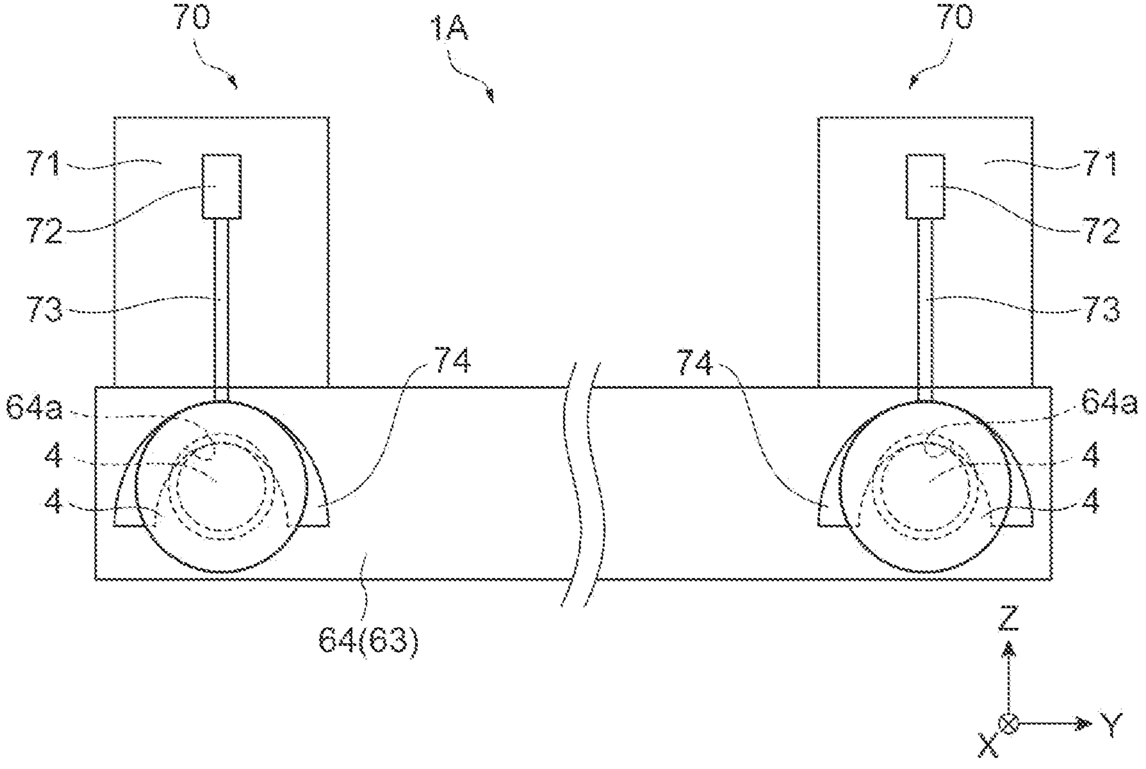

FIGS. 8A and 8B are front views illustrating an example of the guide fixing part. As illustrated in FIGS. 7, 8A, and 8B, the guide fixing parts 70, 70 are provided in the attachment member 64, and each restrict movement in the positive X-axis direction of the squeeze guide member 4 inserted into the first opening 64*a*. The guide fixing parts 70, 70 are respectively provided for the squeeze guide members 4, 4. The guide fixing part 70 includes fixing seats 71, 71, fixing cylinders 72, 72, and wedge members 74, 74 (example of fixing member).

The fixing seat 71 is a plate member erected on the attachment member 64 of the squeeze cylinder 60, for example, and supports the fixing cylinder 72. The fixing cylinders 72, 72 include fixing rods 73, 73. The fixing rod 73 extends from the fixing cylinder 72 toward the first opening 64*a*. The fixing rod 73 extends and contracts by being driven by the fixing cylinder 72. For example, the wedge member 74 is provided at the lower end of the fixing rod 73. The wedge member 74 is a hook member locked onto an outer peripheral surface of the center part of the squeeze guide member 4. The wedge member 74 includes a cutout formed along the outer peripheral surface of the center part of the squeeze guide member 4, for example, and locks the squeeze guide member 4 when the outer peripheral surface of the center part of the squeeze guide member 4 fits into the cutout. Note that the shape of the wedge member 74 is not particularly limited, and may be any shape that can be locked onto the squeeze guide member 4. A pair of guide rails (not illustrated) supported by the attachment member 64 and the fixing seat 71 and extending from the position of the fixing cylinder 72 toward the first opening 64*a* may be provided in the guide fixing part 70. The pair of guide rails are provided to come close to or into contact with the outer edge of the wedge member 74, and guide the wedge member 74 for a more stable movement thereof.

When the squeeze cylinder 60 moves in the positive X-axis direction, the end parts of the squeeze guide members 4, 4 are inserted into the first openings 64*a*, 64*a* of the attachment member 64, and the entire end part protrudes completely from the first opening 64*a*, the wedge members

74, 74 engage with the center parts of the squeeze guide members 4, 4. Specifically, from the state of the guide fixing parts 70, 70 of FIG. 8A, the fixing cylinders 72, 72 drive the fixing rods 73, 73 to extend, so that the wedge members 74, 74 move downward. As illustrated in FIG. 8B, the wedge members 74, 74 reach the respective center parts of the squeeze guide members 4, 4, and the squeeze guide members 4, 4 are locked. In the case where the squeeze guide members 4, 4 are locked by the wedge members 74, 74, respectively, when the squeeze guide members 4, 4 start to move in the positive X-axis direction, the large-diameter end parts of the squeeze guide members 4, 4 abut on the wedge members 74, 74. For this reason, the movement of the squeeze guide members 4, 4 in the positive X-axis direction is restricted. Additionally, when the squeezing is completed, the fixing cylinders 72, 72 drive the fixing rod 73, 73 to contract, so that the wedge members 74, 74 move upward and the engagement between the squeeze guide members 4, 4 and the wedge members 74, 74 is released.

After the squeeze guide members 4, 4 are fixed to the cylinder body 63, sand is supplied to the molding space of each of the upper and lower flasks 2 and 3. A sand supply device 106 supplying the sand will be described later. Squeezing is performed after each molding space is filled with sand. The squeeze cylinder 60 extends the rod 61 in the positive X-axis direction and causes the lower squeeze plate 6 to enter the lower flask 3. The cylinder body 63 is moved in the negative X-axis direction by the reactive force of pressure applied to the sand in the lower flask 3, the squeeze guide members 4, 4 are pulled in the negative X-axis direction through the wedge members 74, 74 with the movement of the cylinder body 63, and the upper squeeze plate 7 enters the upper flask 2. As described above, the squeezing is performed by the lower squeeze plate 6 and the upper squeeze plate 7 moving toward the pattern member 8.

[Details of Sand Supply Device]

The sand supply device 106 is disposed in the second position 105. As illustrated in FIG. 6, the sand supply device 106 includes a storage tank 106*a* storing sand, and a supply part 106*b* supplying sand supplied from the storage tank 106*a* to the upper flask 2 and the lower flask 3. The storage tank 106*a* has a box shape, for example, and includes therein a space that can store sand. The shape of the storage tank 106*a* is not limited, and may be cylindrical, for example. The supply part 106*b* is connected to the internal space of the storage tank 106*a*, and is provided in a lower end part of the storage tank 106*a*. Compressed air is supplied to the storage tank 106*a*. The lower end of the supply part 106*b* is branched into two parts, and supplies sand to the sand inlet 2*a* of the upper flask 2 and the sand inlet 3*a* of the lower flask 3. As a result, the inside of the upper flask 2 and the inside of the lower flask 3 are filled with sand.

[Controller]

As illustrated in FIGS. 1, 5, and 6, A controller 107 is disposed in the negative X-axis direction of the first position 101, for example. The controller 107 is configured as a PLC (programmable logic controller), for example. The controller 107 may be configured as a normal computer system including a main memory such as a CPU (central processing unit), a RAM (random access memory), and a ROM (read only memory), an input device such as a touch panel and a keyboard, an output device such as a display, an auxiliary memory such as a hard disk, and the like. The controller 107 is provided with a control panel on which the operator can perform control. The controller 107 controls movements of configurations of the molding machine 100 such as movement of the upper flask 2 and the lower flask 3, transport of the pattern member 8, rotation of the molding flask unit 1, and squeezing by the lower squeeze plate 6 and the upper squeeze plate 7.

[Molding Method]

Figure 9:
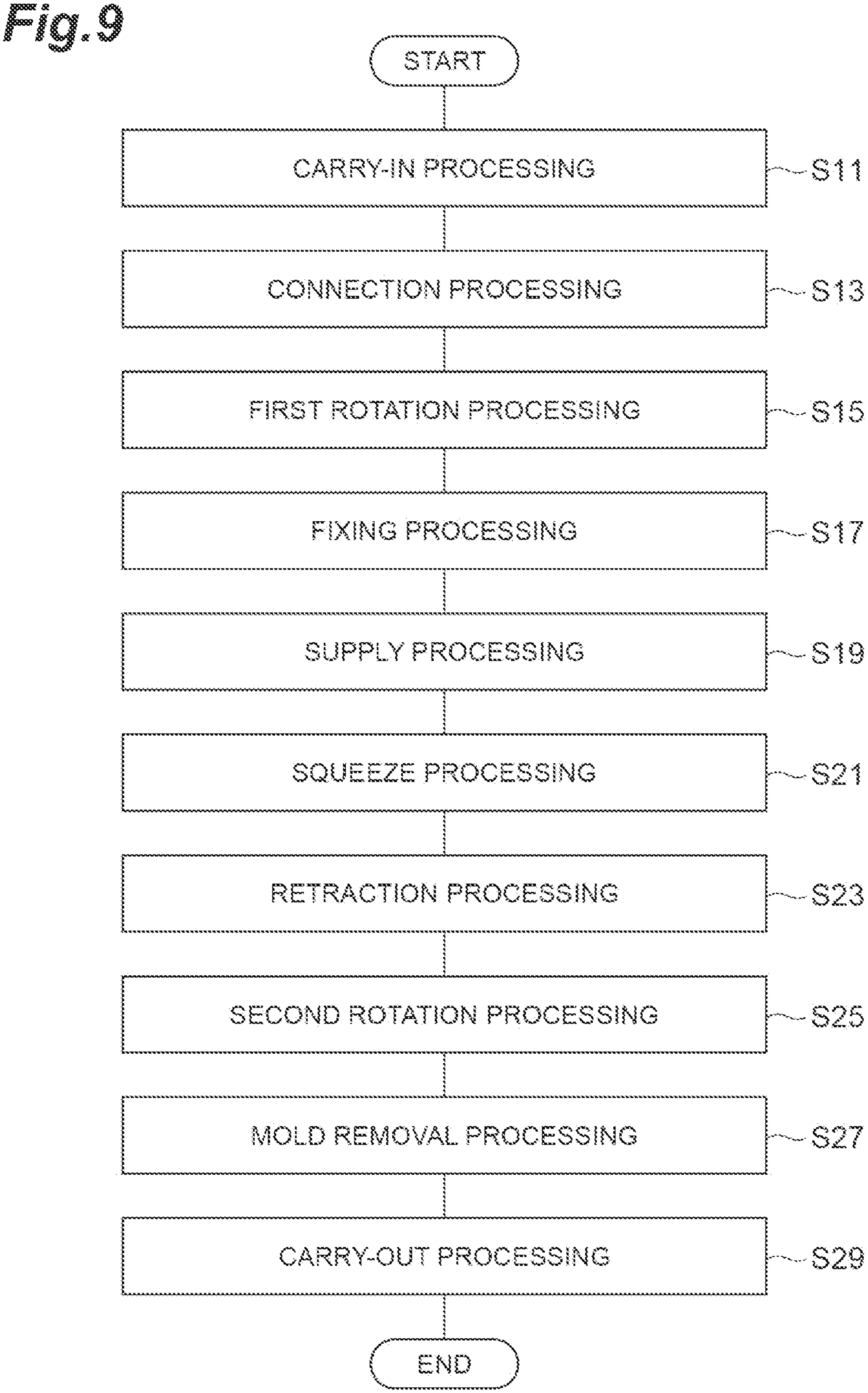
FIG. 9 is a flowchart illustrating an example of a molding method according to the embodiment.

FIG. 9 is a flowchart illustrating an example of a molding method according to the embodiment. The molding method of the present embodiment illustrated in FIG. 9 is started by the controller 107 on the basis of an operator's instruction. First, as carry-in processing (S11), the pattern replacement part 103 carries the pattern member 8 into the first position 101. When the first placement part 45*a* of the pattern replacement part 103 is in the pattern preparation position 40*b*, the operator or the like places the pattern member 8 on the first placement part 45*a* of the pattern replacement part 103. Subsequently, the second arm moving part 43*b* retracts the second placement part 45*b* in the position facing the first position 101 toward the center (positive X-axis direction) of the transport base 41 from the first position 101. The first arm moving part 43*a* retracts the first placement part 45*a* having received the new pattern member 8 toward the center (negative X-axis direction) of the transport base 41 from the pattern preparation position 40*b*. Subsequently, the transport switching part 46 rotates the transport base 41 by 180 degrees and moves the pattern member 8 to the position facing the first position 101. At this time, the upper flask 2 and the lower flask 3 are not connected and are separated. The first placement part 45*a* is moved in the negative X-axis direction of the transport base 41 by the first arm moving part 43*a*. As a result, the first placement part 45*a* is carried to between the flask guide members 5, 5, and the pattern member 8 is carried to between the upper flask 2 and the lower flask 3.

Subsequently, as connection processing (S13), the molding machine 100 connects the upper flask 2 and the lower flask 3. The connection processing (S13) is a step in which the molding machine 100 guides the lower flask 3 upward along the flask guide members 5, 5, and connects the upper flask 2 and the lower flask 3 with the pattern member 8 interposed therebetween. The lower flask adjustment cylinders 14, 14 move the lower flask 3 upward through the lower flask connectors 12, 12. The lower flask 3 acquires the pattern member 8 from the first placement part 45*a* along with the upper movement. The lower flask 3 is moved upward by the lower flask connectors 12, 12 and the lower flask adjustment cylinders 14, 14 until an upper surface of the pattern member 8 abuts on a lower surface of the upper flask 2. As a result, both the upper flask 2 and the lower flask 3 abut on the pattern member 8. Note that after the pattern member 8 is supported by the lower flask 3, the first placement part 45*a* not supporting the used pattern member 8 is retracted toward the center (positive X-axis direction) of the transport base 41 from the first position 101. As a result, at the time of rotation of the molding flask unit 1 described later, it is possible to keep the first arm unit from coming into contact with the molding flask unit 1.

Subsequently, as first rotation processing (S15), the rotating part 102 rotates the molding flask unit 1 such that the molding flask unit 1 is moved from the first position 101 to the second position 105. As a result, the molding flask unit 1 is in the second position 105, and is mounted onto the squeeze unit 104 to form the molding unit 1A.

Subsequently as fixing processing (S17: example of fixing step), the guide fixing part 70 fixes the squeeze guide members 4, 4 to the cylinder body 63 of the squeeze cylinder 60 using the wedge members 74, 74. First, the moving cylinder 65 moves the squeeze cylinder 60 (cylinder body 63) in the positive X-axis direction, and inserts the end parts of the squeeze guide members 4, 4 into the first openings 64*a*, 64*a* penetrating the attachment member 64 along the X axis. After the insertion, the guide fixing parts 70, 70 extend the fixing rods 73, 73 by the fixing cylinders 72, 72 to move the wedge members 74, 74 downward, so that the wedge members 74, 74 abut on the body (center part) of the squeeze guide members 4, 4 and engage therewith. At this time, the upper squeeze plate 7 enters the upper flask 2 to define the molding space for the cope, and the lower squeeze plate 6 enters the lower flask 3 to define the molding space for the cope.

Subsequently, as supply processing (S19), the sand supply device 106 supplies sand to the upper flask 2 and the lower flask 3. The supply part 106*b* of the sand supply device 106 supplies sand to the sand inlet 2*a* of the upper flask 2 and the sand inlet 3*a* of the lower flask 3 to fill the inside of the upper flask 2 and the inside of the lower flask 3 with sand.

Figure 10:
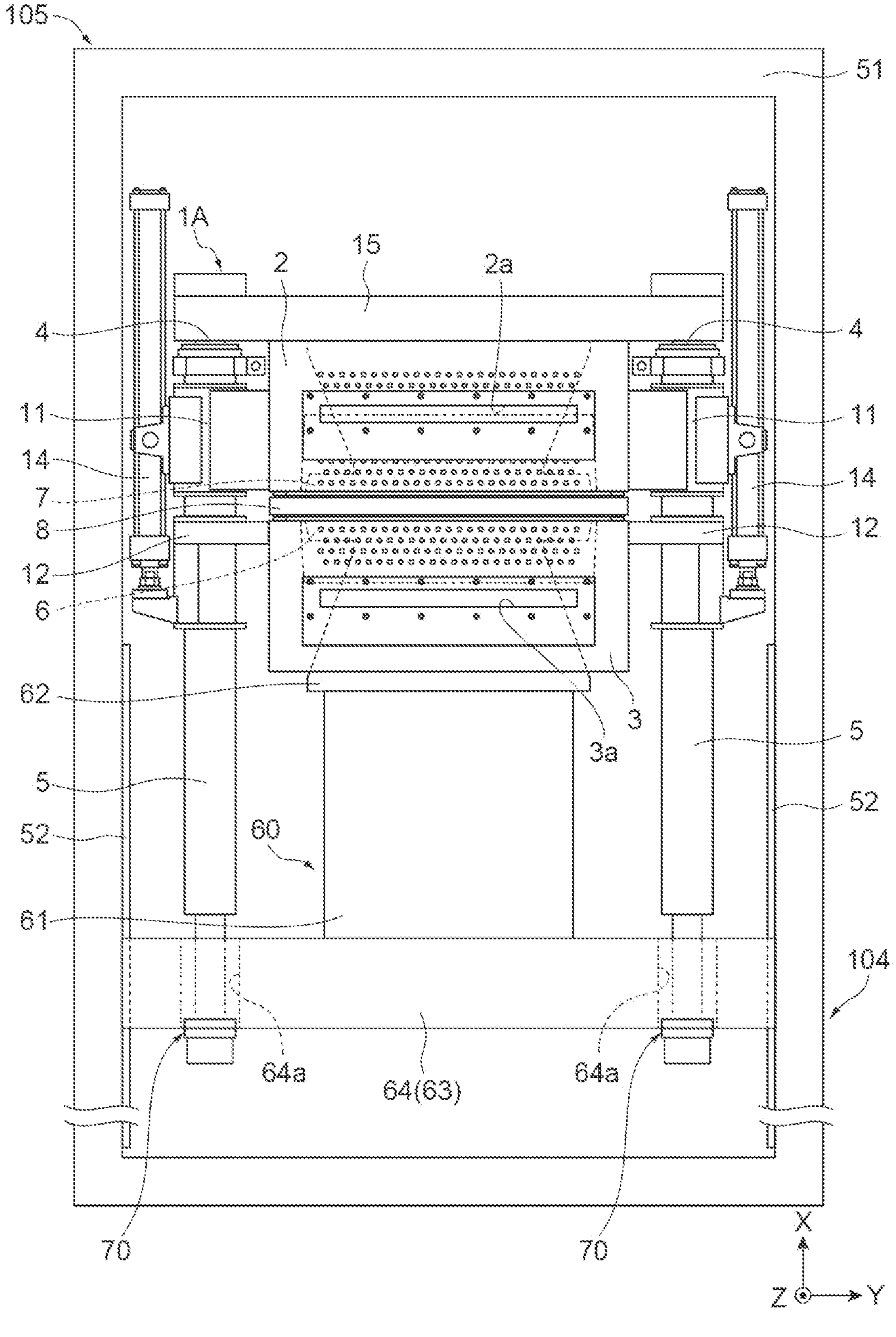
FIG. 10 is a plan view illustrating an example of the molding unit during squeezing.

Subsequently, as squeeze processing (S21: example of driving step), the squeeze cylinder 60 extends the rod 61 to move the lower squeeze plate 6 and compress the sand in the lower flask 3. At this time, the cylinder body 63 is retracted in the negative X-axis direction by the reactive force of the extending force of the rod 61. With the retraction of the cylinder body 63, the upper squeeze plate 7 moves in the negative X-axis direction and compresses the sand in the upper flask 2. Hereinafter, details will be described with reference to the drawings. FIG. 10 is a plan view illustrating an example of the molding unit during squeezing. As illustrated in FIG. 10, the squeeze cylinder 60 extends the rod 61, and the squeeze seat 62 and the lower squeeze plate 6 move in the positive X-axis direction. As a result, the lower squeeze plate 6 performs squeezing by pressing the sand in the lower flask 3 in the positive X-axis direction. The reactive force in the negative X-axis direction obtained when the lower squeeze plate 6 of the cylinder body 63 presses sand in the positive X-axis direction moves the attachment member 64 of the cylinder body 63 in the negative X-axis direction through the rod 61. At this time, the attachment member 64 of the cylinder body 63 is fixed with the squeeze guide members 4, 4 through the guide fixing parts 70, 70 in the fixing processing (S17). For this reason, the attachment member 64 moves the end parts of the squeeze guide members 4, 4 in the negative X-axis direction through the wedge members 74, 74. The squeeze guide members 4, 4 move the upper squeeze plate 7 in the negative X-axis direction through the frame 15, in conjunction with the above configuration. The upper squeeze plate 7 performs squeezing by pressing the sand in the upper flask 2 in the negative X-axis direction. As described above, both the lower squeeze plate 6 and the upper squeeze plate 7 press toward the pattern member 8 to squeeze the sand accommodated inside the upper flask 2 and inside the lower flask 3, and form the cope and the drag, respectively.

Subsequently, as retraction processing (S23), engagement of the squeeze guide members 4, 4 with the wedge members 74, 74 is released by contraction of the fixing rods 73, 73 driven by the fixing cylinders 72, 72. Additionally, the rod 61 contracts. Then, the moving cylinder 65 retracts the cylinder body 63 in the negative X-axis direction. As a result, the lower squeeze plate 6 is carried out of the lower flask 3 and dismounted from the squeeze unit 104.

Subsequently, as second rotation processing (S25), the rotating part 102 rotates the molding flask unit 1 from the second position 105 toward the first position 101.

Subsequently, as mold removal processing (S27), the upper flask adjustment cylinders 13, 13 and the lower flask adjustment cylinders 14, 14 separate the upper flask 2 and the lower flask 3. The pattern replacement part 103 carries out the pattern member 8. Specifically, the first placement part 45*a* is moved in the negative X-axis direction of the transport base 41 by the first arm moving part 43*a*. When the lower flask 3 is moved downward by the lower flask connectors 12, 12 and the lower flask adjustment cylinders 14, 14, the pattern member 8 is placed on the first placement part 45*a*. The first arm moving part 43*a* retracts the first placement part 45*a* having received the used pattern member 8 toward the center (positive X-axis direction) of the transport base 41 from the first position 101 to carry out the pattern member 8. After carrying out the pattern member 8, the upper flask adjustment cylinders 13, 13 and the lower flask adjustment cylinders 14, 14 align the upper flask 2 and the lower flask 3, and remove the molds.

Subsequently, as carry-out processing (S29), a pushout cylinder (not illustrated) is extended to carry the cope and the drag out of the machine (to molding line, for example). When the carry-out processing (S29) is completed, the molding method using the molding flask unit 1 and the molding unit 1A is completed.

SUMMARY OF EMBODIMENT

In the molding unit 1A and the molding machine 100, the lower squeeze plate 6 enters the upper and lower flasks 2 and 3 by the extension of the rod 61 of the squeeze cylinder 60. Here, the squeeze cylinder 60 is disposed to be movable relative to the upper and lower flasks 2 and 3, and therefore is moved in the opposite direction of the squeezing direction of the lower squeeze plate 6 by the reactive force obtained through the lower squeeze plate 6. The upper squeeze plate 7 is fixed to the cylinder body 63 by the pair of squeeze guide members 4, 4, and therefore move in the opposite direction of the squeezing direction of the lower squeeze plate 6 with the movement of the squeeze cylinder 60. As a result, the lower squeeze plate 6 and the upper squeeze plate 7 can move toward each other using one squeeze cylinder 60. As described above, the molding unit 1A can perform squeezing appropriately using one squeeze cylinder 60. Hence, the molding unit 1A and the molding machine 100 can reduce initial cost as compared to a molding unit of a molding machine that performs squeezing with a plurality of actuators. Moreover, each of the pair of squeeze guide members 4, 4 is disposed to be movable through a corresponding one of the flask guide members 5, 5. As a result, in the molding unit 1A, interference between the pair of squeeze guide members 4, 4 and the pair of flask guide members 5, 5 can be avoided. Hence, in the molding unit 1A, the pair of squeeze guide members 4, 4 can be disposed in positions where the squeeze members (lower squeeze plate 6 and upper squeeze plate 7) can be supported stably, while the pair of flask guide members 5, 5 can be disposed in positions where the weights of the upper and lower flasks 2 and 3 can be supported stably. Hence, the molding unit 1A can reduce manufacturing cost while appropriately ensuring molding accuracy.

Additionally, the pair of flask guide members 5, 5 are disposed in positions symmetric with respect to the central line passing through the center of each of the upper flask 2 and the lower flask 3. In this case, the pair of flask guide members 5,5 and the pair of squeeze guide members 4, 4 disposed inside the pair of flask guide members 5, 5 are disposed in positions symmetric with respect to the center of the upper flask 2 and the lower flask 3. As a result, since the pair of flask guide members 5, 5 can support the weights of the upper flask 2 and the lower flask 3 in a balanced manner, the upper flask 2 and the lower flask 3 are guided stably. Moreover, since the pair of squeeze guide members 4, 4 can fix the upper squeeze plate 7 to the cylinder body 63 in a balanced manner, a uniform and appropriate squeezing force can be applied stably to the inside of the upper and lower flasks 2 and 3. Hence, the molding unit 1A can further curb deterioration of molding accuracy.

Additionally, each of the pair of squeeze guide members 4, 4 includes the tip end part to which the upper squeeze plate 7 is fixed and the terminal end part, and the wedge members 74, 74 fixing the pair of squeeze guide members 4, 4 to the cylinder body 63 are further provided. In this case, the molding unit 1A can fix the position of the upper squeeze plate 7 relative to the cylinder body 63 of the squeeze cylinder 60 using the wedge members 74, 74.

Additionally, in the molding machine 100, the pattern member 8 is carried in or out from between the upper flask 2 and the lower flask 3 by the transport part 40. The transport switching part 46 can rotate the transport part 40 disposed to face the upper and lower flasks 2 and 3 to a position not facing the upper and lower flasks 2 and 3, for example. As a result, by placing the new pattern member 8 on the transport part 40 (second placement part 45*b*) disposed in the position (pattern preparation position 40*b*) not facing the upper and lower flasks 2 and 3 and then rotating by the transport switching part 46, the new pattern member 8 to be sandwiched by the upper flask 2 and the lower flask 3 can be replaced smoothly. Hence, the molding machine 100 can smoothly replace the pattern member 8 and perform molding even in a case of molding using a plurality of pattern members.

Additionally, in the molding method, in the fixing processing (S17: example of fixing step), the pair of squeeze guide members 4, 4 fixed with the upper squeeze plate 7 are fixed to the cylinder body 63. In the squeeze processing (S21: example of driving step), the lower squeeze plate 6 is driven by the squeeze cylinder 60. The upper squeeze plate 7 is fixed to the cylinder body 63 by the pair of squeeze guide members 4, 4, and therefore move in the opposite direction of the squeezing direction of the lower squeeze plate 6 with the movement of the squeeze cylinder 60. With this molding method, as in the case of the molding unit 1A and the molding machine 100 described above, manufacturing cost can be reduced while ensuring molding accuracy.

[Modification]

Note that the embodiment described above illustrates an example of the molding machine according to the present disclosure. The molding machine according to the present disclosure is not limited to the molding machine 100 according to the embodiment, and the molding machine 100 according to the embodiment may be modified or applied to other configurations without departing from the scope described in the claims. For example, the molding machine 100 may be configured to include only the molding unit 1A.

For example, some of the steps of the molding method in the embodiment described above may be independent of order. That is, the steps may be performed in orders different from the described order. The molding method only needs to include the fixing processing (S17) and the squeeze processing (S21), and part or the entirety of the rest of the processing need not be included.

The molding machine 100 may be configured to not include the rotating part 102, and be configured to apply squeezing force from upper to lower directions or from lower to upper directions. The molding unit 1A is applicable not only to a flaskless molding machine (flask-removing molding machine) in which the mold is removed after forming the mold, but also a flask molding machine, that is, a molding machine in which, after forming a mold, the molding flask is sent out to a casting line without removing the mold and leaving the mold therein.

Additionally, the guide fixing part 70 does not need to have the fixing cylinder 72. At this time, for example, the guide fixing part 70 may include a fixing rail and a fixing drive part instead of the fixing cylinder 72. The fixing seat 71 supports the fixing rail. The fixing rail extends toward the first opening 64*a*. The fixing drive part is attached to the fixing rail in a movable manner. The fixing drive part includes a motor and moves along the fixing rail. The wedge member 74 is provided at the lower end of the fixing drive part. The fixing drive parts drive the wedge members 74, 74 to move downward along the fixing rails, so that the wedge members 74, 74 engage with center parts of the squeeze guide members 4, 4.

Additionally, while the lower flask 3 is fixed to the lower flask connectors 12, 12 and is guided along the flask guide members 5, 5 by the lower flask adjustment cylinders 14, 14 in the embodiment described above, the disclosure is not limited thereto. In the following description, configurations that are the same or have the same functions as those of the above embodiment are assigned the same reference numerals.

Figure 11:
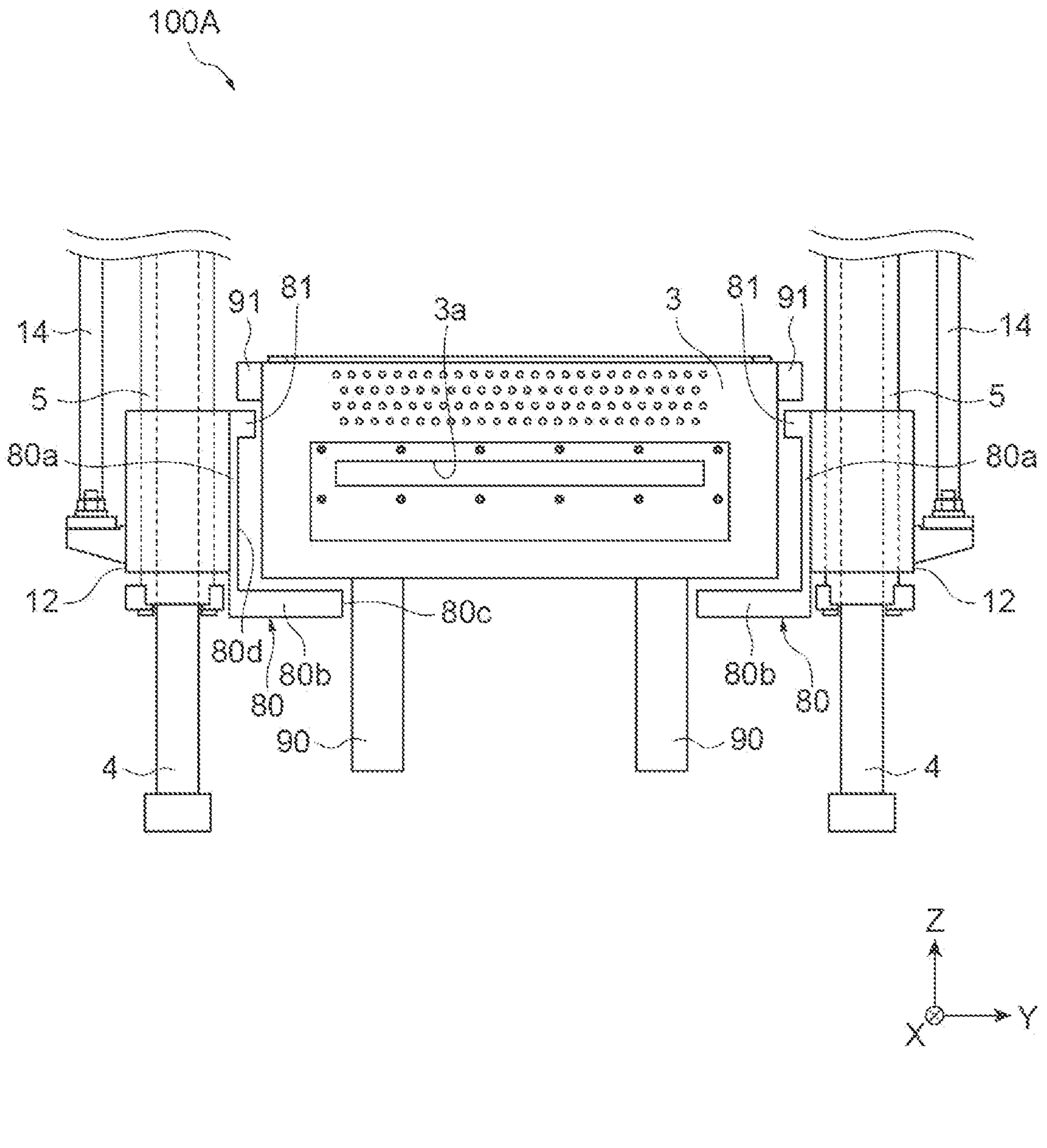
FIG. 11 is a front view illustrating an example of a molding machine according to a modification.

FIG. 11 is a front view illustrating an example of a molding machine including a slide part according to a modification. As illustrated in FIG. 11, a molding machine 100A is different from the molding machine 100 in the supporting structure of a lower flask 3, and is different in that it further includes slide parts 90, 90, and the rest of the configuration is the same. Hereinafter, the differences are mainly described, and overlapping description is omitted.

The molding machine 100A further includes lower flask supporting parts 80, 80 and slide parts 90, 90. In a first position 101, a lower flask 3 is supported by the lower flask supporting parts 80, 80. The lower flask 3 includes an abutting part 91 in an upper part of a side surface thereof.

The lower flask supporting parts 80, 80 are fixed to lower flask connectors 12, 12. Hence, the lower flask supporting parts 80, 80 can be moved in the up-down direction by lower flask adjustment cylinders 14, 14. The lower flask supporting part 80 includes aside wall 80*a* extending along the XZ plane, and a bottom part 80*b* extending along the XY plane in a lower end part of the side wall 80*a*. The lower flask supporting parts 80, 80 are separated in the Y direction, and form a second opening 80*c*. The lower flask supporting part 80 defines an accommodation space 80*d* that can accommodate the lower flask 3.

A support abutting part 81 protruding toward the accommodation space 80*d* is provided on the inner side of the side wall 80*a* in an upper end part of the lower flask supporting part 80. The support abutting part 81 abuts on the abutting part 91 of the lower flask 3 from below by being moved upward by the lower flask adjustment cylinder 14, and can support the lower flask 3.

The slide parts 90, 90 slide the lower flask 3 separated from the upper flask 2. That is, the slide parts 90, 90 slide the lower flask 3 from between the flask guide members 5, 5. The slide part 90 is a rail extending in the X direction, for example. For example, in the first position 101, the slide parts 90, 90 slide the lower flask 3 toward an operator positioned in the negative X-axis direction. The slide part 90 can protrude into the accommodation space 80*d* of the lower flask supporting part 80 from the second opening 80*c* of the lower flask supporting part 80. By protruding into the accommodation space 80*d*, the slide part 90 can support the lower flask 3 away from the lower flask supporting part 80. The slide parts 90, 90 support the lower flask 3, and then move the lower flask 3 in the negative X-axis direction.

For example, after the mold removal processing (S27) and before the carry-out processing (S29) and processing in which a first placement part 45*a* is newly inserted between an upper flask 2 and the lower flask 3, as flask removal processing, the operator may carry out the lower flask 3 by the slide parts 90, 90. In the mold removal processing (S27), the lower flask supporting parts 80, 80 are moved downward by the lower flask adjustment cylinders 14, 14. When the lower flask supporting parts 80, 80 move to a predetermined position, the slide parts 90, 90 are relatively inserted upward from between the lower flask supporting parts 80, 80. As a result, the lower flask 3 that was supported by the support abutting parts 81, 81 of the lower flask supporting parts 80, 80 is supported by the slide parts 90, 90. After the lower flask 3 is supported by the slide parts 90, 90, the flask removal processing is performed, and the lower flask 3 can be slid in the negative X-axis direction along the slide parts 90, 90. Thus, the slide parts 90, 90 can slide the lower flask 3 from between the flask guide members 5, 5. Accordingly, the operator can easily access the lower flask 3 without interfering with the flask guide members 5, 5 and the upper flask 2. As a result, workability when the operator installs a core in the lower flask 3 is improved.

Figure 12A:
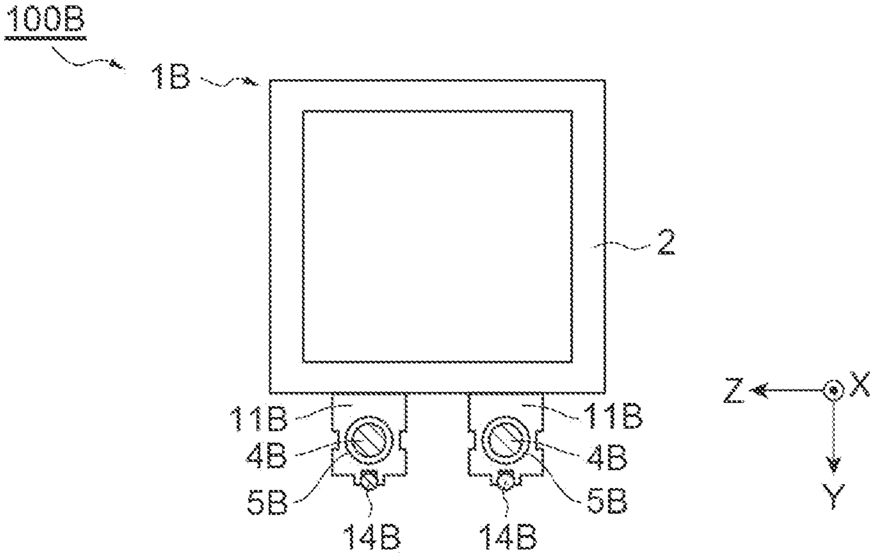
FIGS. 12A-12C are a cross-sectional view illustrating a part of a molding unit according to a modification.

Additionally, the flask guide members 5, 5 and the squeeze guide members 4, 4 do not have to be disposed in positions symmetric with respect to the central line passing through the center of each of the upper flask 2 and the lower flask 3. FIG. 12A is a cross-sectional view illustrating a part of a molding unit according to a modification. FIG. 12A is a cross-sectional view of a molding unit 1B according to a modification taken along a line in the same position as line XII-XII of FIG. 7, where some members are omitted. As illustrated in FIG. 12A, the molding unit 1B in a molding machine 100B is different from the molding unit 1A in the molding machine 100 in that squeeze guide members 4B, 4B and flask guide members 5B, 5B are disposed to be concentrated at one side wall of an upper flask 2, and the rest of the configuration is the same. Hereinafter, the differences are mainly described, and overlapping description is omitted.

In a second position 105, the squeeze guide members 4B, 4B and the flask guide members 5B, 5B of the molding unit 1B extend along the XY plane, for example. Upper flask connectors 11B, 11B are connected to one side wall extending along the XZ plane of the upper flask 2. The upper flask connectors 11B, 11B are disposed in positions symmetric with respect to the center of the side wall of the upper flask 2. The upper flask connector 11B is connected with the flask guide member 5B in a movable manner. The upper flask 2 is supported by the squeeze guide members 4B, 4B, the flask guide members 5B, 5B, and the upper flask connectors 11B, 11B provided in the upper flask 2. Although not illustrated in FIG. 12A, a lower flask 3 is also supported by the squeeze guide members 4B, 4B, the flask guide members 5B, 5B, and lower flask connectors provided in one side wall of the lower flask 3. The lower flask 3 is moved by the driving force of lower flask adjustment cylinders 14B, 14B.

As in the case of the embodiment described above, a squeeze cylinder 60 in the molding unit 1B is also disposed to be movable relative to the upper and lower flasks 2 and 3, so that the molding unit 1B can perform squeezing appropriately using one squeeze cylinder. As compared to a molding unit of a conventional molding machine, the molding unit 1B and the molding machine 100B, too, can reduce manufacturing cost including initial cost and the like. Moreover, as in the case of the embodiment described above, in the molding unit 1B, the squeeze guide member 4B is disposed to be movable inside the flask guide member 5B, so that interference between the squeeze guide member 4B and the flask guide member 5B can be avoided. Since space in the molding unit 1B can be saved as compared to a case where the squeeze guide member and the flask guide member are disposed independently, the operator can access configurations of the molding unit 1B more easily before and after molding, for example, and workability is improved. Additionally, in the molding unit 1B, since the squeeze guide members 4B, 4B and the flask guide members 5B, 5B are disposed in a concentrated manner at one side wall of the upper and lower flasks 2 and 3, space facing other side walls of the upper and lower flasks 2 and 3 can be saved. Note that while the molding unit 1B includes two squeeze guide members 4B, 4B and two flask guide members 5B, 5B, three or more squeeze guide members 4B and three or more flask guide members 5B may be provided.

Figure 12B:
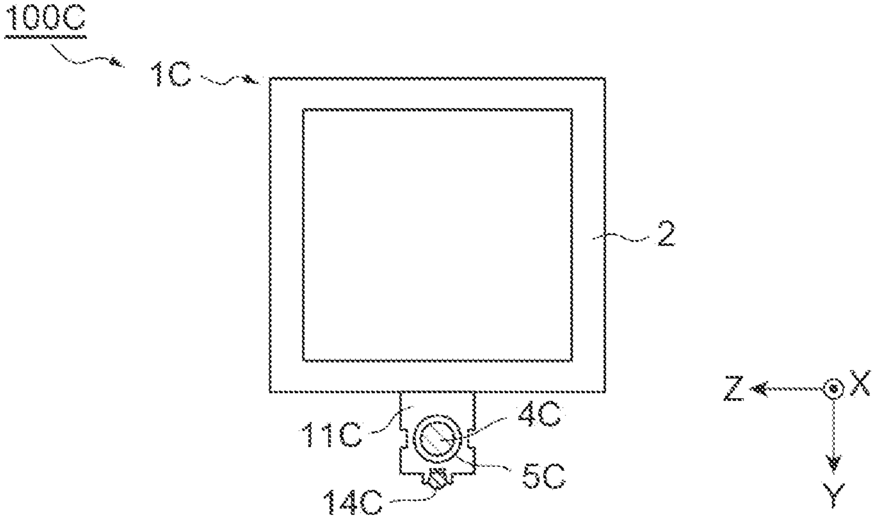

Additionally, the molding unit and the molding machine may include one squeeze guide member and one flask guide member instead of the squeeze guide members 4, 4 and the flask guide members 5, 5. FIG. 12B a cross-sectional view illustrating a part of a molding unit according to a modification. FIG. 12B is a cross-sectional view of a molding unit 1C according to a modification taken along a line in the same position as line XII-XII of FIG. 7, where some members are omitted. As illustrated in FIG. 12B, the molding unit 1C in a molding machine 100C is different from the molding unit 1A in the molding machine 100 in the position relative to an upper flask and number of the squeeze guide member and the flask guide member, and the rest of the configuration is the same. Hereinafter, the differences are mainly described, and overlapping description is omitted.

The molding unit 1C includes one squeeze guide member 4C, one flask guide member 5C, and one upper flask connector 11C. The squeeze guide member 4C and the flask guide member 5C extend along the XY plane, for example. The upper flask connector 11C is connected to one side wall of an upper flask 2 extending along the XZ plane. The upper flask connector 11C is disposed to be at the center of the side wall of the upper flask 2 when viewed in the X direction. The upper flask connector 11C is connected with the flask guide member 5C in a movable manner. The upper flask 2 is supported by the squeeze guide member 4C, the flask guide member 5C, and the upper flask connector 11C provided in the upper flask 2. Although not illustrated in FIG. 12B, a lower flask 3 is also supported by the squeeze guide member 4C, the flask guide member 5C, and a lower flask connector provided in one side wall of the lower flask 3. The lower flask 3 is moved by the driving force of a lower flask adjustment cylinder 14C.

As in the case of the embodiment described above, a squeeze cylinder 60 in the molding unit 1C is also disposed to be movable relative to the upper and lower flasks 2 and 3, so that the molding unit 1C can perform squeezing appropriately using one squeeze cylinder. For this reason, as compared to a molding unit of a conventional molding machine, the molding unit 11C and the molding machine 100C, too, can reduce manufacturing cost including initial cost and the like. Moreover, as in the case of the embodiment described above, in the molding unit 1C, the squeeze guide member 4C is disposed to be movable inside the flask guide member 5C, so that interference between the squeeze guide member 4C and the flask guide member 5C can be avoided. Since space in the molding unit 1C can be saved as compared to a case where the squeeze guide member and the flask guide member are disposed independently, the operator can access configurations of the molding unit 1C more easily before and after molding, for example, and workability is improved.

Additionally, since only one squeeze guide member 4C and only one flask guide member 5C are disposed in the molding unit 1C, space can be saved as compared to configurations of the molding unit 1A and 1B and a molding unit 1D described later in which a plurality of squeeze guide members and a plurality of flask guide members are disposed, for example. As compared to the molding units 1A and 1B and the molding unit 1D described later, as well as the molding machines 100A and 100B and a molding machine 100D described later, the molding unit 1C and the molding machine 100C can reduce both the number of squeeze guide members and the number of flask guide members, so that manufacturing cost including initial cost and the like can be reduced even more.

Figure 12C:
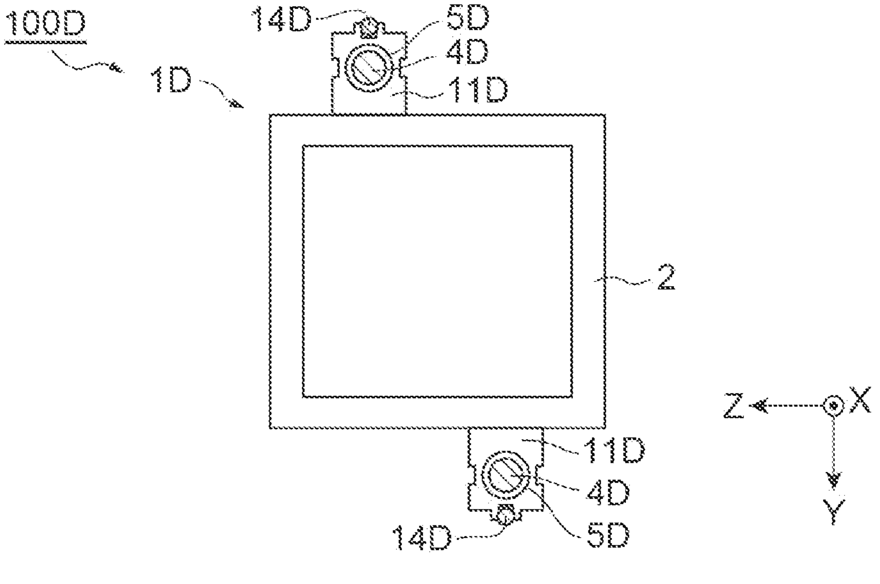

The flask guide members 5, 5 and the squeeze guide members 4, 4 do not need to be disposed in positions symmetric with respect to the XZ plane in the upper flask 2 and the lower flask 3 in the second position 105. FIG. 12C is a cross-sectional view illustrating a part of a molding unit according to a modification. FIG. 12C is a cross-sectional view of the molding unit 1D according to a modification taken along a line in the same position as line XII-XII of FIG. 7, where some members are omitted. As illustrated in FIG. 12C, the molding unit 1D in the molding machine 100D is different from the molding unit 1A in the molding machine 100 in that positions of squeeze guide members 4D, 4D and flask guide members 5D, 5D relative to an upper flask 2 in a second position 105 are not symmetric with respect to a surface along the XZ plane and are symmetric with respect to the center of the upper flask 2 on the YZ plane, and the rest of the configuration is the same. Hereinafter, the differences are mainly described, and overlapping description is omitted.

In the second position 105, the squeeze guide members 4D, 4D and the flask guide members 5D, 5D of the molding unit 1D extend along the XY plane, for example. Upper flask connectors 11D, 11D are respectively connected to two side walls extending along the XZ plane of the upper flask 2. The upper flask connectors 11D, 11D are not disposed in positions symmetric with respect to a surface along the XZ plane and are disposed in positions symmetric with respect to the center of the upper flask 2 on the YZ plane. The upper flask connector 11D is connected with the flask guide member 5D in a movable manner. The upper flask 2 is supported by the squeeze guide members 4D, 4D, the flask guide members 5D, 5D, and the upper flask connectors 11D, 11D provided in the upper flask 2. Although not illustrated in FIG. 12C, a lower flask 3 is also supported by the squeeze guide members 4D, 4D, the flask guide members 5D, 5D, and a lower flask connector provided in two side walls of the lower flask 3. The lower flask 3 is moved by the driving force of lower flask adjustment cylinders 14D, 14D.

As in the case of the embodiment described above, a squeeze cylinder 60 in the molding unit 1D is also disposed to be movable relative to the upper and lower flasks 2 and 3, so that the molding unit 1D can perform squeezing appropriately using one squeeze cylinder. As compared to a molding unit of a conventional molding machine, the molding unit 1D and the molding machine 100D, too, can reduce manufacturing cost including initial cost and the like. Moreover, as in the case of the embodiment described above, in the molding unit 1D, the squeeze guide member 4D is disposed to be movable inside the flask guide member 5D, so that interference between the squeeze guide member 4D and the flask guide member 5D can be avoided. Since space in the molding unit 1D can be saved as compared to a case where the squeeze guide member and the flask guide member are disposed independently, the operator can access configurations of the molding unit 1D more easily before and after molding, for example, and workability is improved. Additionally, in the molding unit 1D in the second position 105, the squeeze guide members 4D, 4D and the flask guide members 5D, 5D are disposed in different positions in the Z direction, so that other configurations of the molding unit 1D or the molding machine 100D can be disposed in different positions and freedom in design can be improved. Note that while the molding unit 1D includes two squeeze guide members 4D, 4D and two flask guide members 5D, 5D, three or more squeeze guide members 4D and three or more flask guide members 5D may be provided.

REFERENCE SIGNS LIST

1 . . . molding flask unit, 1A, 1B, 1C, 1D . . . molding unit, 2 . . . upper flask, 3 . . . lower flask, 4, 4B, 4C, 4D . . . squeeze guide member, 5, 5B, 5C, 5D . . . flask guide member, 6 . . . lower squeeze plate (example of first squeeze member), 7 . . . upper squeeze plate (example of second squeeze member), 8 . . . pattern member, 13 . . . upper flask adjustment cylinder (example of flask moving part), 14, 14B, 14C, 14D . . . lower flask adjustment cylinder (example of flask moving part), 40 . . . transport part, 45 . . . placement part, 46 . . . transport switching part, 60 . . . squeeze cylinder, 61 . . . rod, 63 . . . cylinder body, 74 . . . wedge member (example of fixing member), 90 . . . slide part, 100, 100A, 100B, 100C, 100D . . . molding machine.

What is claimed is:

1. A molding unit comprising:

an upper flask;

a lower flask configured to connect to the upper flask;

a flask guide member to which the upper flask and the lower flask are connected in a movable manner, the flask guide member guiding the upper flask and the lower flask;

a first squeeze member and a second squeeze guide member disposed in such a manner as to sandwich the upper and lower flasks as the upper flask and the lower flask connect with each other, the first squeeze member and the second squeeze guide member each capable of entering the upper and lower flasks;

a squeeze cylinder disposed to be movable relative to the upper and lower flasks, and including a rod having an end part fixed to the first squeeze member and a cylinder body extending and contracting the rod; and a squeeze guide member configured to fix relative positions of the second squeeze guide member and the cylinder body, wherein the flask guide member is a hollow rod member, and the squeeze guide member is a rod member disposed in a movable manner inside the flask guide member.

2. The molding unit according to claim 1 further comprising a pair of flask guide members including the flask guide member, and a pair of squeeze guide members including the squeeze guide member and a second squeeze guide member, wherein each of the pair of flask guide members is a hollow rod member, and each of the pair of squeeze guide members is a rod member disposed in a movable manner inside a corresponding one of the flask guide members.

3. The molding unit according to claim 2, wherein the pair of flask guide members are disposed in positions symmetric with respect to a central line passing through a center of each of the upper flask and the lower flask.

4. The molding unit according to claim 3, wherein the squeeze guide member includes a tip end part to which the second squeeze member is fixed and a terminal end part, and the molding unit further comprises a fixing member fixing the terminal end part of the squeeze guide member to the cylinder body.

5. The molding unit according to claim 2, wherein the squeeze guide member includes a tip end part to which the second squeeze member is fixed and a terminal end part, and the molding unit further comprises a fixing member fixing the terminal end part of the squeeze guide member to the cylinder body.

6. The molding unit according to claim 1, wherein the squeeze guide member includes a tip end part to which the second squeeze member is fixed and a terminal end part, and the molding unit further comprises a fixing member fixing the terminal end part of the squeeze guide member to the cylinder body.

7. A molding machine comprising:

the molding unit according to claim 1;

a flask moving part moving the upper flask and the lower flask relative to each other along the flask guide member such that a pattern member is sandwiched between and released from the upper flask and the lower flask;

a transport part carrying the pattern member in and out from between the upper flask and the lower flask; and a transport switching part rotating the transport part.

8. The molding machine according to claim 7 further comprising a slide part sliding the lower flask in a state where the upper flask and the lower flask are separated.

9. A molding method using a molding unit, the molding unit including an upper flask, a lower flask configured to connect to the upper flask, a flask guide member to which the upper flask and the lower flask are connected in a movable manner, the flask guide member guiding the upper flask and the lower flask, a first squeeze member and a second squeeze member disposed in such a manner as to sandwich the upper and lower flasks as the upper flask and the lower flask connect with each other, the first squeeze member and the second squeeze guide member each capable of entering the upper and lower flasks, a squeeze cylinder disposed to be movable relative to the upper and lower flasks, and including a rod having an end part fixed to the first squeeze member and a cylinder body extending and contracting the rod, and a squeeze guide member configured to fix relative positions of the second squeeze guide member and the cylinder body, the flask guide member being a hollow rod member, and the squeeze guide member being a rod member disposed in a movable manner inside the flask guide member, the molding method comprising:

fixing the squeeze guide member to the cylinder body, and extending the rod to perform squeezing by the first squeeze member and the second squeeze member.

* * * * *